(12) United States Patent
Sforzo

(10) Patent No.: US 8,155,984 B2
(45) Date of Patent: Apr. 10, 2012

(54) COMPUTERIZED METHOD, APPARATUS AND SYSTEM FOR ISSUING SURETY BONDS

(76) Inventor: Joseph Sforzo, Massapequa, NY (US)

(*) Notice: Subject to any disclaimer, the term of this patent is extended or adjusted under 35 U.S.C. 154(b) by 132 days.

(21) Appl. No.: 11/701,127

(22) Filed: Feb. 1, 2007

(65) Prior Publication Data

US 2007/0179877 A1 Aug. 2, 2007

Related U.S. Application Data

(63) Continuation of application No. 09/694,776, filed on Oct. 23, 2000, now Pat. No. 7,194,435.

(60) Provisional application No. 60/161,212, filed on Oct. 22, 1999.

(51) Int. Cl.
  *G06Q 40/00* (2012.01)
(52) U.S. Cl. .............. 705/4; 705/38; 705/35; 705/37
(58) Field of Classification Search .............. 705/38, 705/4, 35, 37
  See application file for complete search history.

(56) References Cited

U.S. PATENT DOCUMENTS

| | | | | |
|---|---|---|---|---|
| 4,567,359 A | * | 1/1986 | Lockwood | 235/381 |
| 5,655,085 A | * | 8/1997 | Ryan et al. | 705/4 |
| 5,987,434 A | * | 11/1999 | Libman | 705/36 R |
| 6,009,402 A | * | 12/1999 | Whitworth | 705/4 |
| 7,430,516 B1 | * | 9/2008 | Blair et al. | 705/4 |
| 7,644,019 B2 | * | 1/2010 | Woda et al. | 705/35 |
| 2002/0026334 A1 | * | 2/2002 | Igoe | 705/4 |

OTHER PUBLICATIONS

Schroeder, Stephanie; Risk Management v46n6 Jun. 1999.*
Relience Group Providing On-line Access to Worker's Comp, Auto Surety, Professional Liablity Coverages..Dec. 1998.*
Flatness, Dennis; The State of the Surety Agency, American Agent & Broker; Jul. 1994; 66,7.*
Wulff (Building credibility with contactors and sureties), American Agent and Broker v68n7 pp. 24-27 Jul. 1996, (Wulff).*

* cited by examiner

*Primary Examiner* — Jagdish Patel
(74) *Attorney, Agent, or Firm* — Thomas A. O'Rourke; Bodner & O'Rourke, LLP

(57) ABSTRACT

A method, system and apparatus for obtaining a bond is disclosed. The Invention employs a computer system that has a work station in communication with a server to provide information on a contractor that is required by a surety over the computer system. The server is provided with owner/obligee information concerning a bond over the network A surety is selected to provide the bond and the identity of the surety is presented over said computer network. The type of bond sought is identified. Approval of the bond is requested over the computer network and a decision on the bond request is obtained over the network. The approval decision includes an authorization code that is presented at a bid letting along with the contractor's bid. The authorization code permits an owner/obligee to view an approved bond through the computer network.

65 Claims, 45 Drawing Sheets

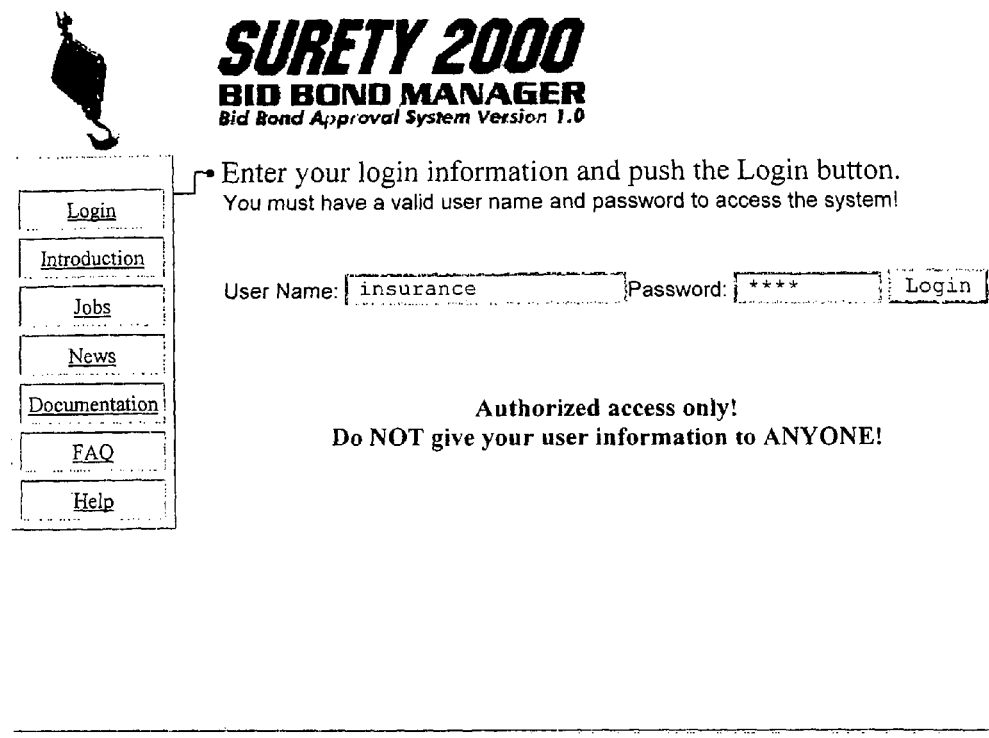

This is the login page. In order to use Surety2000 you must receive a user name and password from Surety2000. At least one participating surety must authorize you first. Then Surety2000 will give you the necessary user and password.

For purposes of this presentation we will use the user name "insurance" and password "john" After the user name and password are inserted you will click on "login".

FIGURE 1C

SURETY 2000
BID BOND MANAGER
Bid Bond Approval System Version 1.0

Insurance Agency
John Doe

3/2/99

- Login
- Main Menu
- Contractors
- Employees
- FAQ
- Documentation
- Help

• Agency Main Menu:

| New Bond | Search Bonds | Approved Bonds 180+ | Pending Bonds | Dead Bonds |

Search Approved Bonds By:

Owner/Obligee [_____] Search

Contractor [_____] Search

Bond Number [_____] Search

---

This is the main menu. The system has identified the user and the date. From here you can navigate to any part of the system. Look across the horizontal bar. You can enter a new bond, search for an approved bid bond, search for an approved bid bond that is over 180 days old, search for a pending bond, or search for a dead bond.

Let's start by searching for all pending bid bonds. A pending bid bond is a bid bond that has been entered into the system but, is waiting to be approved.

Click on "pending bonds" on the horizontal bar.

FIGURE 2

You will see that the "Pending Bond" section in the horizontal bar is highlighted. You may enter the name of a contractor or owner/obligee and do a specific search. Let's search for all of your pending bonds. (remember that the system knows who you are what bonds you are authorized to view)

To search for all pending bid bonds simply leave the fields blank and click on the "search box" next to the contractor field.

FIGURE 3

This is a very valuable tool for the surety agent. As each bid bond is entered into the system for your agency, the bid bond will be listed here in chronological order of bid date. This screen can be used as a daily work list of bid bonds to be approved. The appropriate surety company can see the pending bid bond and accept it as the bid bond request. To the right of the screen is "edit" and "view". (sorry, the printer cannot print items that you must scroll to the right to see on a monitor.)

Let's click edit. (remember, you cannot see "edit" here but, you will be able to see it on your monitor).

FIGURE 4

This is a pending bid bond. It is a review of the information as it will appear when it is approved. You can change the bid date, estimated contract price, amount of bid bond, ifb number and the description of the job. Then you can return it into the pending list, approve the bid bond, or send it into the dead file where it cannot return.

SURETY 2000
BID BOND MANAGER
*Bid Bond Approval System Version 1.0*

Insurance Agency
John Doe

3/1/99

- Login
- Main Menu
- Contractors
- Employees
- FAQ
- Documentation
- Help

→Enter New Bid Bond Step 1 of 4

Contractor Information:
- Company Name: abc    [ Next > ]
- Address:
- City:
- State:
- Zip Code:

Owner/Obligee/Job Information:
- Owner/Obligee:
- Bid Bond Form:
- Address:
- City:
- State:
- Zip Code:
- Bid Date:
- Estimated Contract Price:
- Amount of Bid Security:
- Contract # or IFB#:

Description of Job:

Bid Bond Status: Approved Pending
Reset

This is the screen after you click on "new bond". First enter the first few letters of the contractors name in the top field. (if the contractor has not been entered into Surety2000 you will have to enter the contractor information into the system. It's easy and we'll show you later). For this presentation we are using ABC Contracting Inc. Enter abc into the field and click "next".

FIGURE 6

Surety2000 found the contractor for you. Sometimes Surety2000 will find several contractors for you with similar names. You pick the exact name by clicking on the name. In this case there is only one ABC Contracting Inc. If there was ABC Plumbing, ABC Electrical, etc. you would choose from that selection.

Click on ABC.

SURETY 2000
BID BOND MANAGER
Bid Bond Approval System Version 1.0

Insurance Agency
John Doe

3/2/99

- Login
- Main Menu
- Contractors
- Employees
- FAQ
- Documentation
- Help

→ Enter New Bid Bond Step 3 of 4

Contractor Information:
- Contractor: ABC CONTRACTING, INC.
- Address: 100 SMITH STREET
- City: ANYWHERE
- State: NY
- Zip Code: 1111111

Surety: [ Select a Surety ▼ ]

Owner/Obligee/Job Information:
- Owner/Obligee:
- Bid Bond Form: [ Select a Bid Bond Form from the list... ]
- Address:
- Additional Address:
- City:
- State: [ New York ▼ ]
- Zip Code:
- Bid Date: __/__/__
- Estimated Contract Price:
- Amount of Bid Security:
- Contract # or IFB#:
- Description of Job:

Bid Bond Status: ○ Approved ● Pending

[ Next > ]

The contractor's name that you chose is inserted in the field. This will avoid clerical errors. Move down to "surety". The scroll down screen will list all the sureties that have authorized you. They can rescind that authority at any time from their Surety2000 website.

Complete the remaining fields. The estimated contract price is optional. Surety2000 is Year 2000 compliant. (Insert 1999 in the field for year).

FIGURE 8

SURETY 2000
BID BOND MANAGER
*Bid Bond Approval System Version 1.0*

Insurance Agency
John Doe

3/2/99

- Login
- Main Menu
- Contractors
- Employees
- FAQ
- Documentation
- Help

►Enter New Bid Bond Step 3 of 4

Contractor Information:
- Contractor: ABC CONTRACTING, INC.
- Address: 100 SMITH STREET
- City: ANYWHERE
- State: NY
- Zip Code: 1111111

Surety: Liberty Mutual Insurance Co.

Owner/Obligee/Job Information:
- Owner/Obligee: State of Virginia Department of Transportation
- Bid Bond Form: Bid Bond in accordance with contract specifications
- Address:
- Additional Address:
- City:
- State: Virginia
- Zip Code: 12345
- Bid Date: 02/ 21/ 1999
- Estimated Contract Price: optional
- Amount of Bid Security: ten percent of bid bond not to exceed .....
- Contract # or IFB#: 654321
- Description of Job: insert job decription here Bid Bond Status: ● Approved ○ Pending Next >

Complete all the fields remaining. You may pend this bond or approve it. Let's approve this bid bond. Be sure the approved circle is highlighted then click "next"

FIGURE 9

SURETY 2000
BID BOND MANAGER
Bid Bond Approval System Version 1.0

Insurance Agency
John Doe

3/1/99

- Login
- Main Menu
- Contractors
- Employees
- FAQ
- Documentation
- Help

Please Verify the information below is correct then Finish.
Date of Bid Bond Entry: 3/1/99 7:08:08 PM
Entered by: John Doe
Surety Name: Liberty Mutual Insurance Co.
NAIC#: 23043
State of Incorporation: MA
Contractor: ABC CONTRACTING, INC.
Address: 100 SMITH STREET,ANYWHERE,NY 1111111
Owner/Obligee: State of Virginia Department of Transportation
Address:
Additional Address:
Bid Bond Form: BidBond in accordance with Contract Specifications
Bid Date: 2/21/1999
Contract Price optional
Amount of Bid Security: ten percent of amount bid not to exceed...
Contract # or IFB#: 654321
Description of Job: insert description of project here.
Bid Bond Status: Approved Finish This is a final review of all the information before the bid bond is executed. THE DATE OF THE ENTRY TO THE SECOND IS ARCHIVED The entry date and time will become the time of execution on the next screen. Note: just as a paper bid bond must be issued on time for a bid letting, a Surety2000 bid bond must be approved prior to the bid letting time. The owner/obligee will take note of this time. The NAIC code is also listed in order to specifically identify the surety.

Review the information and click on "Finish". The next screen is the bid bond.

FIGURE 10

This is your electronic bid bond. The code at the top is the "authorization code". This code must be given to your contractor. The contractor will present this code at the bid letting along with the bid. The owner/obligee will login to Surety2000, insert the "authorization code" and view the bid bond as you see it here.

The surety will be able to view all executed bid bonds by their agents.

You may print this screen and use it to fax the code to your contractor and retain it for your records.

A bid bond can be executed or put into pending by knowledgeable surety personnel in less than ninety seconds.

Surety2000 has been proven to save money, decrease errors, deter fraud, and provide an overall better service to your contractor.

FIGURE 11

SURETY 2000
BID BOND MANAGER
*Bid Bond Approval System Version 1.0*

Insurance Agency
John Doe

3/1/99

Enter Contractor Information Below

- Login
- Main Menu
- Contractors
- Employees
- FAQ
- Documentation
- Help

| | |
|---|---|
| Company Name | abc contracting |
| Contact Person | optional |
| Phone Number | optional |
| Address | required |
| City | required |
| State | Alabama |
| Zip Code | required |

Submit

Complete information that must be reproduced on the bid bond such as complete name and address. Contact person and telephone number is optional. Click "submit" and you can execute their first bond.

FIGURE 12

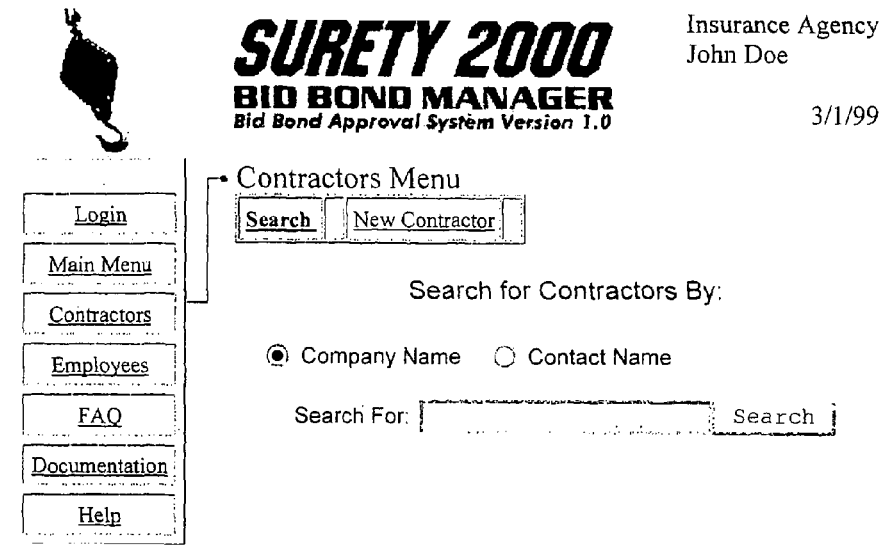

A contractor has to be entered into Surety2000 before a bid bond can be executed. There is no fee for entering a contractor. As you use the system you will enter a contractor when you are entering the first bid bond for that contractor. (You could enter your entire list all at once if you choose.)

Go to the vertical column at the left. Click on "contractors". You can search for an existing contractor or enter "new contractor". Click on "new contractor" and complete the fields on the next screen.

FIGURE 12A

SURETY 2000
BID BOND MANAGER
*Bid Bond Approval System Version 1.0*

Insurance Agency
John Doe

3/1/99

- Login
- Main Menu
- Contractors
- Employees
- FAQ
- Documentation
- Help

Surety Employee List

| Search | New Employee |

You may select Edit, Add, or Delete from the table below: Page 1 of 1

| Surety Agent | User Name | Phone | Action... |
|---|---|---|---|
| John Doe | Insurance | 555-555-5555 | Edit... Delete |

You can grant employees power of attorney. A surety must enter your agency first and empower on-person and grant that person administration ability. That individual can enter or delete powers from employees.

Use the vertical bar at the left. Click "employees". Click "new employees" on the horizontal bar.

FIGURE 13

SURETY 2000
BID BOND MANAGER
Bid Bond Approval System Version 1.0

Insurance Agency
John Doe

3/1/99

- Enter Employee Information Below 7995

| | |
|---|---|
| Employee Name | John Doe |
| Address | Broadway |
| City | Anywhere |
| State | NY |
| Zip Code | 121212 |
| Phone Number | 555-555-5555 |
| Login Name | Insurance |
| Password | **** |
| Verify Password | **** |
| Admin Access | ✓ |
| Enabled | ✓ |
| Submit | Reset |

- Login
- Main Menu
- Contractors
- Employees
- FAQ
- Documentation
- Help

Complete the fields. Allow the employee to enter their own password. Decide if you want to pass on the administration ability or not. Click "submit" and that employee can login to Surety2000. You can enter this section, search for an employee and "unauthorize" within seconds.

A password cannot be retrieved by anyone or even Surety2000. If a password is forgotten a new password must be submitted.

FIGURE 14

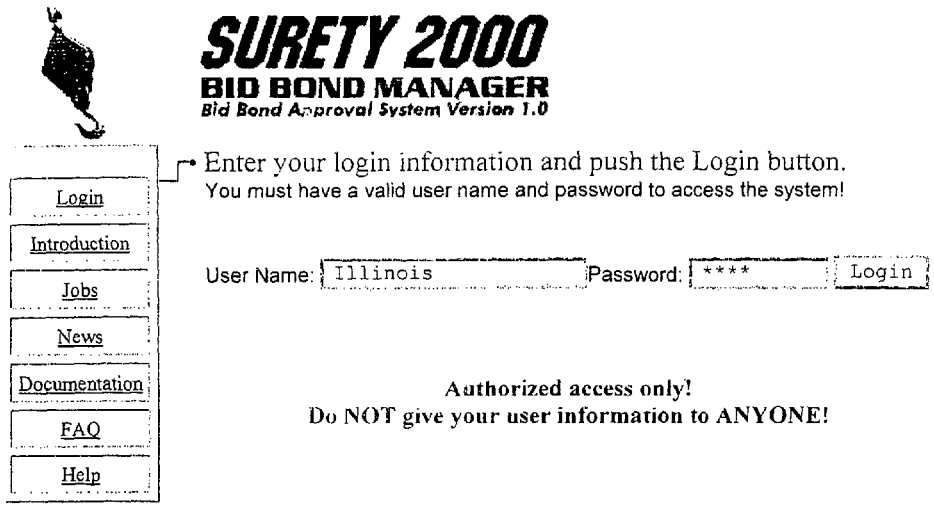

This is the login page. You will need a user name and password. Each owner/obligee will be given one user name by Surety2000. That person will choose a password and also decide who will be able to use the system within their agency. . An owner/obligee can only *view* executed bid bonds. No changes or transactions can be made.

We have used the State of Illinois Department of Transportation for the purposes of this presentation. The user name and password are entered and then click next.

FIGURE 15

This is the owner main menu. At the bid letting contractors will present "authorization codes". Simply insert the code in the "bond number" field and click submit. The code begins with "s". (surety). The next two letters are the State (il. Illinois). The next two numbers are the year the bond was executed (99). The remaining numbers are unsequenced and selected by the Surety2000 server.

FIGURE 16

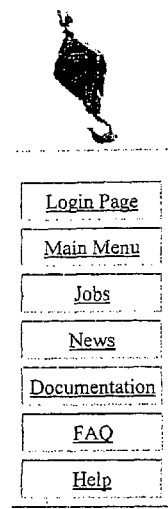

SURETY 2000
BID BOND MANAGER
*Bid Bond Approval System Version 1.0*

State of Illinois Department of Transportation
Jeff Heck

3/3/99

- Login Page
- Main Menu
- Jobs
- News
- Documentation
- FAQ
- Help

The Following Bond has been Executed

S2000 Bond ID: SIL991001343
Date of Bid Bond Approval: 3/3/99 2:55:22 PM
Contractor: ABC CONTRACTING, INC.
Address: 100 SMITH STREET, ANYWHERE, NY 1111111
Surety Name: Reliance Surety Company
State of Incorporation: PA
NAIC#: 41980
Owner/Obligee: State of Illinois Department of Transportation
Address: , , IL 12345
Amount of Bid Security: ten percent of bid amount not to exceed...
Description of Job: insert description of job here...
Bond Form: BidBond in accordance with Contract Specifications
Contract # or IFB#: 456123
Entered by:
Executed by: Joseph V. Sforzo Search Bonds By:

Bond Number [          ] Submit

This is the electronic Surety2000 bid bond. The exact date and time of the bid bond approval is archived. The name of the surety and the NAIC code is submitted. This code designates the exact surety and avoids the confusion of similar surety names. The name of the person who executed the bid bond is at the very bottom.

All information that is inserted in bid bond forms is presented here. The bid bond form is herein agreed that it is the form within the specification.

This screen can be printed and retained.

Simply insert the next authorization code in the bond number field and click submit to view the next bid bond.

FIGURE 17

BMS Login Form

CompanyID:

Username:

Password:

[Log]

FIGURE 19

Manager Feature Section Layout

Company Name:

Contact Person: Phone Number:

Address:

City:

State / Province:    Zip:    Country:

| -- State or Province -- |

Company Name:
_____

Contact Person:            Phone Number:

Address:
_____
_____

City:
_____

State / Province:     Zip:     Country:

State Of Incorporation     NAIC Number:

Division:

Address:

City:

State / Province:          Zip:     Country:

State Of Incorporation          NAIC Number:

[Add]

FIGURE 24

Company Name:

Contact Person:                    Phone Number:

Address:

City:

State / Province:         Zip:      Country:

State Of Incorporation              NAIC Number:

Company Name:

Contact Person: Phone Number:

Address:

City:

State / Province: Zip: Country:

Subsidiary:
Address:
City:
State / Province:    Zip:    Country:
  
FIGURE 29

First Name | Last Name

Title

Address

City:

State / Province: | Zip: | Country:

Phone | Permissions

Username: | Password: | Verify Password:

Add

FIGURE 30

Add Preferred Contractor: To add to your list of preferred contractors, search for the contractor you wish to add using the form below.

Federal Tax ID: [        ] [Search]

FIGURE 31

Company Name:

Tax ID Number:    Phone Number:

Address:

City:

State / Province:    Zip:    Country:

First Name    Last Name

Title

Address

City:

State / Province:    Zip:    Country:

Phone    Permissions

Username:    Password:    Verify Password:

Add

FIGURE 34

First Name          Last Name

Title

Address

City:

State / Province:          Zip:     Country:

Phone                      Permissions

Username:   Password:   Verify Password:

Form used to update existing surety information. The update form appears below.

Company Name:

Contact Person:      Phone Number:

Address:

City:

State / Province:    Zip:    Country:

State Of Incorporation    NAIC Number:

[Update]

FIGURE 38

Division:

Address:

City:

State / Province:    Zip:    Country:

State Of Incorporation

FIGURE 39

Contains form to update Agency information. The form used appears below:

Company Name:

Contact Person:     Phone Number:

Address:

City:

State / Province:    Zip:    Country:

The add subsidiaries form appears below:

Subsidiary:

Address:

City:

State / Province:   Zip:   Country:

Add

FIGURE 41

COMPUTERIZED METHOD, APPARATUS AND SYSTEM FOR ISSUING SURETY BONDS

This application claims priority on U.S. Provisional Patent Application Ser. No. 60/161,212, filed Oct. 22, 1999, and is a continuation of U.S. application Ser. No. 09/694,776, filed on Oct. 23, 2000 now U.S. Pat. No. 7,194,435.

FIELD OF THE INVENTION

The present invention is in the field of improvements in the issuance of surety bonds and related products.

BACKGROUND OF THE INVENTION

By the term surety bond is generally meant a bond issued by an insurance or other company as surety on behalf of a principal whereby the surety legally binds itself to an obligee for an amount of money guaranteed to the obligee for the faithful performance of a contract or other act of the principal. The bonds of the present invention can include bid bonds, contract, court and subdivision bonds, performance bonds, customs bonds, notary bonds, liquor license bonds, license and permit bonds, small business administration bonds, bail bonds, supersedeas bonds or other bonds required in litigation, etc. Also applicable to the invention are binding certificates of insurance and policy endorsements and other insurance related documentation.

When a contractor, builder or supplier etc. wishes to bid on a construction project or submit a bid in connection with a governmental purchase of equipment or supplies the entity seeking bid typically requires that for a bidder to be considered for the job a bid bond must be submitted with the bid. Many municipalities have their own bid form and others use a format approved of by the American Institute of Architects. In the typical bid bond the principal is the person who is submitting the bid. The surety is typically an insurance or bonding company who pursuant to the bond is "held and firmly bound" to the entity seeking the bid for a predetermined sum, usually some percentage of the bid amount. In the event the bid is accepted the bond becomes effective and protects the entity awarding the contract by assuring the entity of faithful performance of the contract as well as prompt payment of labor and materials furnished in performing the contract. In addition, the bond protects the bid seeking entity from the failure of the winning bidder from ultimately entering into the contract that is being awarded by paying the difference between the winning bid and the amount that the entity would have to pay to another party to complete the project because of the default.

Each bidder submits a bid bond with its bid in the appropriate form decided upon by the entity seeking the bids. In the event the wrong form of bid bond is used the party submitting the bond runs the risk that the entity soliciting the bonds will reject the bid out of hand even if the person submitting the bond was the low bidder. Many agencies soliciting bids are reluctant to accept a bid with an improper bid bond form because there is a risk that the losing bidders who submitted the proper form may challenge the agency if it awards the bid to based on an improper bid form.

When a contractor, for example, is submitting a bid, much of the contractor's effort is spent massaging the bid to make sure the contractor has a bid that he considers is his best for the particular job. Since much of the pre bid effort is spent calculating and recalculating material and/or labor costs, frequently a bid bond is not sought by the contractor until just before the bidding deadline. In addition, many contractors are bidding on a plurality of jobs at a time. Furthermore, for many projects and contracts there are multiple bidders bidding on the project. For the non winning bidders their bond terminates and only the winning bidder's bond has any effect. As a result a great deal of effort has to be done in a short period of time to prepare multiple bonds.

Surety companies typically rely on local agents to receive the bond request and process the necessary paper work to complete the bid bond. For certain bond requests where the amount of the bond request is low the agent may have authority to issue a bond without approval from the surety company. For other requests the surety company must approve the bond requests. One of the problems that agents have in submitting bonds for approval is that the requests are typically faxed to a central location at the surety company where they sit for an extended period of time before the request is presented to the proper person for approval of the request. Once the bond request is approved, the agent must prepare the actual bond which must be signed by the agent on behalf of the surety company. In order to save time in the process many surety companies provide their agents with executed powers of attorney for them to retain at their offices until needed. While this procedure saves considerable time in the procedure of issuing bonds there is also the risk that an agent could issue a bond inappropriately to an unsatisfactory party. While the procedure described above is for bid bonds, the current steps and procedures for issuing other types of bonds are similar.

As a result of the time deadlines and security issues in the current methods and procedures for issuing bonds there is a need for improved methods and apparatus for obtaining bonds.

OBJECTS OF THE INVENTION

It is an object of the invention to provide a method of obtaining bonds using a computer system.

It is an object of the invention to provide a system and apparatus for computerizing the issuance of bonds.

It is an object of the present invention to provide increased security in the issuance of bonds.

It is an object of the invention to improve the time necessary for issuing bonds.

SUMMARY OF THE INVENTION

The invention is directed to improved methods, apparatus and system for issuing and transmitting surety bonds, including but not limited to bid bonds, contract, court and subdivision bonds, performance bonds, customs bonds, notary bonds, liquor license bonds, license and permit bonds, small business administration bonds, bail bonds, supersedeas bonds or other bonds required in litigation, etc. The present invention also has applicability in the field of insurance and other businesses including but not limited to binding certificates of insurance and policy endorsements. The invention relates generally to computerized systems and more particularly to a computerized system for automated issuances of bonds through a communications linkage for communicating and processing information necessary for the issuance of a bond in a timely and efficient manner. The invention also relates to a system for the collection, processing, and dissemination of bond related information generated from the application process.

The present invention is a computerized system for automated execution of bonds through an Internet or Intranet website or other communications linkage for communicating and processing information. In addition, the present invention permits designated persons to view approved bonds from remote locations as a security feature. In order to log onto the system a user account and/or password are inputted.

BRIEF DESCRIPTION OF THE DRAWINGS

FIG. 1C is a view of a representative logon page for access to the system.

FIG. 2 is a view of a representative agency main menu for the system.

FIG. 3 is a view of a representative agency pending bond search page for the system.

FIG. 4 is a view of a representative surety pending bonds page for the system.

FIG. 6 is a view of step 1 on a representative new bond page for the system.

FIG. 8 is a view of step 3, the selection of the surety, for the preparation of a new bond.

FIG. 9 is a view of the page of FIG. 8 with additional information added.

FIG. 10 is a view of a verification page for the new bond.

FIG. 11 is a view of an approved bond.

FIG. 12 is an enter contractor page which permits the agent to place his contractor information in the system prior to needing the information for a bond.

FIG. 12A is a contractor search page.

FIG. 13 is a page listing approved employees of the agency.

FIG. 14 is a page for identifying the approved employees of the agency.

FIG. 15 is a representative page for an obligee to logon to view executed bid bonds.

FIG. 16 is a representative page for the obligee to submit the contractor code to view a contractors bond information.

FIG. 17 is a representative page showing the executed contractor's bond.

FIG. 19 is a representative login dialog.

FIG. 24 shows a representative form used to add divisions.

FIG. 29 shows a representative form to add subsidiaries.

FIG. 30 shows a representative form to add new employees of the surety to the system.

FIG. 31 shows a representative preferred contractor form.

FIG. 34 shows a representative format used to add new employees of the contractor into the system.

FIG. 38 shows a representative form used to update existing surety information.

FIG. 39 shows a representative form used to add surety divisions appears in FIG. 39.

FIG. 41 shows a form to add agency subsidiaries.

DETAILED DESCRIPTION OF THE INVENTION

Figure 1A:
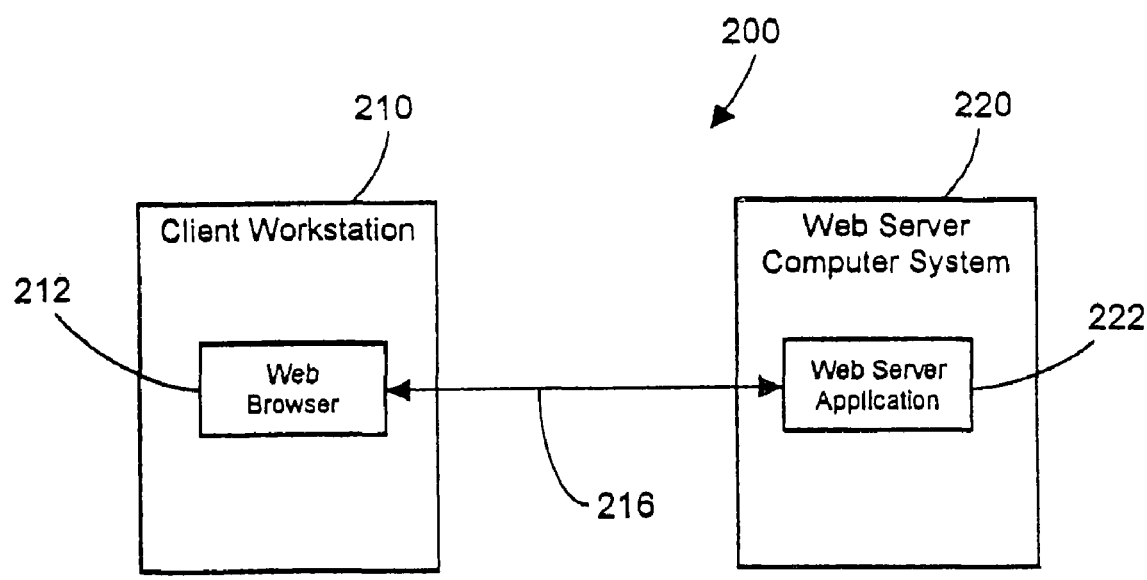
FIG. 1A shows a block diagram of a representative computer system that would be used by the user to access information over a network such as an LAN, Wan, the Internet or an Intranet.
Figure 1B:
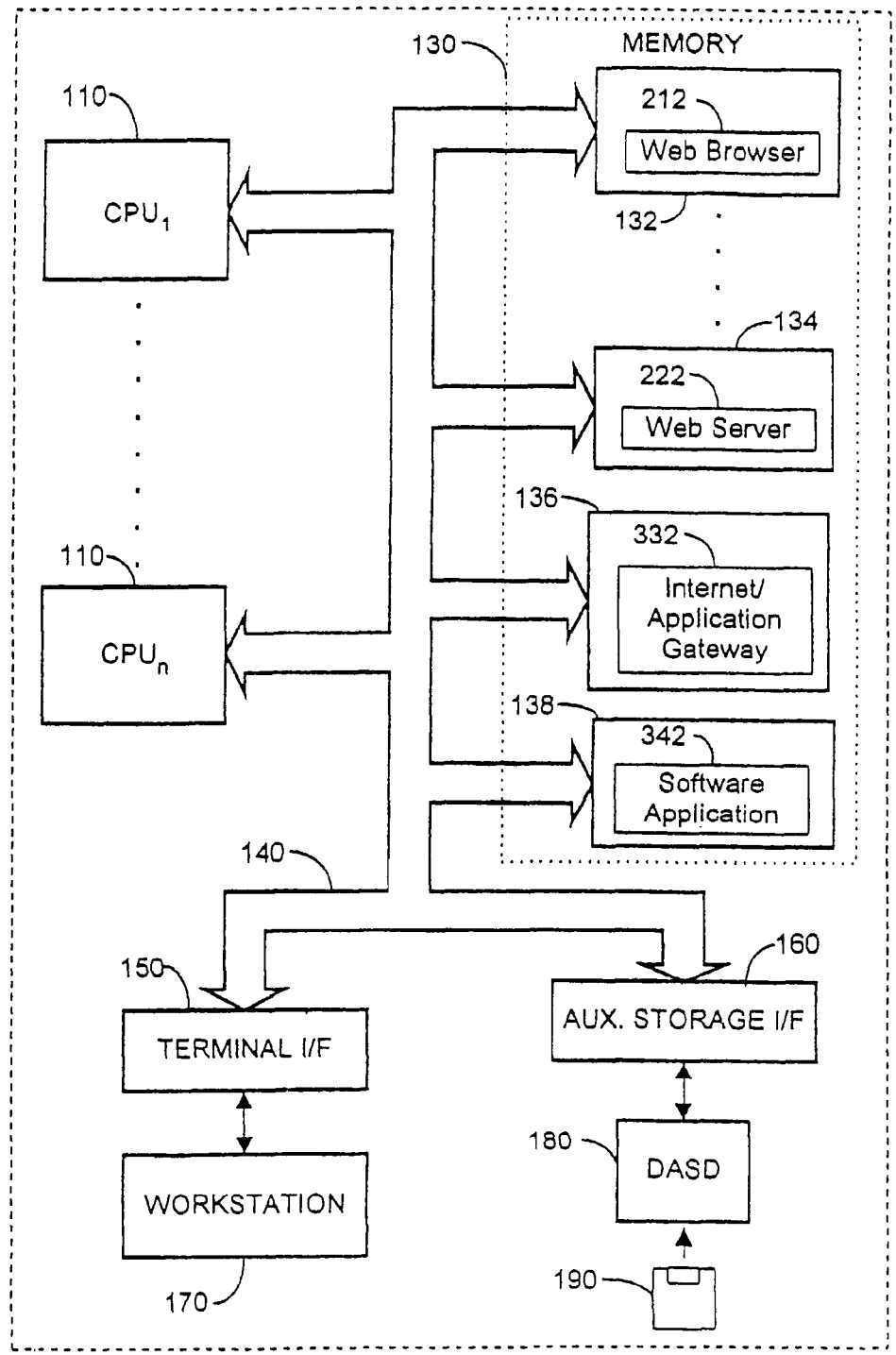
FIG. 1B is a block diagram of a system that allows access to a software application of the present invention over the World-Wide Web from a standard web browser.

In the present invention the agent or other person seeking a bid bond or any other bond has a password and/or account number in order to logon to the system from a remote location using the Internet, an Intranet or other communication means. FIG. 1A and FIG. 1B show representative computer systems that may be used by the agent in connection with the present invention. The present invention is directed to a system and more preferably a computer network for accessing the information on a network, such as the Internet. The term computer network as used herein is used in its broadest sense, i.e., as any configuration of data processing devices and software connected for information exchange. The present invention can include personal computers, personal digital assistants (PDA's), set top boxes used on or in connection with televisions, and any other type of appliance that can access a collection of data such as the Internet.

In one embodiment the appliance can include a network that serves to connect together a plurality of devices, e.g., terminals, computers, etc. Networks typically comprise a plurality of devices such as computers some of which function as servers to provide services to the other computers connected to the network. There are many types of computer networks in existence. They are known by various names including Local Area Network (LAN), Wide Area Network (WAN), Internet and the like and may be implemented in accordance with a variety of known architectures.

Referring to FIG. 1A, in one embodiment of the invention there is a typical transaction between a standard web browser or other communications software 212 running on a client workstation 210 and a web server or other software application permitting communication with said workstation 222 running on a computer system 220 occurs over a connection (communication link or communication mechanism) 216. Client workstation 210 may be coupled to other computer systems via a local area network (LAN) or via any other type of computer network or other interconnection. Likewise, computer system 220 may be coupled to other computer systems as well. Client workstation 210 may be any computer that is capable of providing access to a local area network (LAN) or via any other type of computer network or other interconnection to the WWW by using web browser or other communications software 212. This would include handheld, portable or laptop computers, standard desktop computer systems, etc.

Web browser 212 is a software program running on client workstation 210 that allows a user at client workstation 210 to communicate with other computers over connection 216. Web browser 212 would include but is not limited to any web browser, which is capable of transmitting and receiving data over the WWW. This includes commercial software applications such as IBM's WebExplorer, Internet Netscape Navigator, Microsoft Explorer, Apple Computer's CyberDog, and any other software application which now exist or which may be developed in the future for accessing or processing information over the WWW. The preferred embodiment for connection 216 is any suitable communication link or communication mechanism to the Internet, including by telephone, cable lines or other hard wired method, infrared or other wireless communications, wireless computer network communications, or any other suitable connection between computers, whether currently known or developed in the future.

It should be noted that client workstation 210 and web server computer system 220 may be the same physical and/or logical computer system. Web browser 212 typically displays pages of data including but not limited to data in the form of HTML, XML, XHTML or their future incarnations to a user at client workstation 210. Other types of data (besides HTML) may also be transmitted to web browser 212, including text data, graphical data (e.g., Graphic Image Format (GIF) files), audio data or sound files (e.g., WAV files), Java applets (executable code) and a specialized data form known as Multipurpose Internet Mail Extensions (MIME) data (which may include combinations of the foregoing and other data types).

Web server application 222 is a software program running on web server computer system 220 that allows a user at client workstation 210 to access information controlled by web server 220. One preferred embodiment of web server application 222 in accordance with the present invention is a commercial web server application such as IBM's Internet Connection Server. Other applications are also compatible with the present invention. Web server computer system 220 typically outputs pages of HTML data to WEB browser 212 in response to requests by web browser 212 that reflect action taken by the user at client workstation 210. In addition, as explained above, web server computer system 220 may output other types of data to web browser 212 as well. Output data may include static HTML pages (meaning that the content of the page does not vary), or may include data that must be dynamically determined and inserted into the output data. Web server application 222 may dynamically build output data (e.g., an HTML page) from parts that it retrieves from memory within web server computer system 220 or from other computer systems, or may simply pass through a page that has been constructed at an earlier time or by another computer.

Web browser 212 typically interacts with web server application 222 by transmitting input (e.g., a Uniform Resource Locator (URL) or an HTML page) over connection 216 to web server computer system 220. This input is typically transmitted using HyperText Transfer Protocol (HTTP) 1.0. Web server computer system 220 running web server application 222 receives the input from web browser 212, and in response, outputs data (e.g., an HTML page) to browser 212. Web server computer system 220 may also have numerous other software components, including Common Gateway Interface (CGI) programs or modules, for performing desired functions. The process described above illustrates a basic transaction over the Internet, recognizing that many details and variations that are within the scope of the present invention are not disclosed herein for the purpose of providing a simple context for understanding the concepts of the present invention.

In a preferred embodiment, the user seeking a bond accesses the web site of the bonding agency usually by inputting a URL for the appropriate web site. The web page is displayed on the monitor of client workstation 210. Web pages are generally written in Hypertext Markup Language (HTML). However, they can be written in XML, XHTML or their future incarnations. When web server application 222 running on web server computer system 220 receives a web page request, it will build a web page in HTML or retrieve a file containing a pre-built web page and send it off across connection 216 to the requesting web browser 212. Web browser 212 understands HTML and interprets it and outputs the web page to the monitor of client workstation 210. This web page displayed on the user's screen may contain text, graphics, and links (which are URL addresses of other web pages.) These other web pages (i.e., those represented by links) may be on the same or on different web servers. The user can retrieve these other web pages by clicking on these links using a mouse or other pointing device. This entire system of web pages with links to other web pages on other servers across the world collectively comprises the "World-Wide Web" (WWW).

Referring now to FIG. 1B, a computer system in accordance with one embodiment of the present invention may include: one or more Central Processing Units (CPUs) 110; a terminal interface 150; an auxiliary storage interface 160; a workstation 170; a Direct Access Storage Device (DASD) 180; a floppy disk 190; a bus 140; and a memory 130 which includes multiple locations for containing various software programs. In this example, memory 130 includes a web browser 212 running in location 132, a web server application 222 running in location 134, an Internet/application gateway program 332 running in location 136, and a software application 342 running in location 138.

CPUs 110 perform computation and control functions of system 100. All CPUs associated with system 100 may each individually comprise a single integrated circuit, such as a microprocessor, or may comprise any suitable number of integrated circuit devices and/or circuit boards working in cooperation to accomplish the functions of a central processing unit. All CPUs are capable of suitably executing the programs contained within memory 130 and acting in response to those programs or other activities that may occur in system 100.

Memory 130 is any type of memory known to those skilled in the art. This would include Dynamic Random Access Memory (DRAM), Static RAM (SRAM), flash memory, cache memory, etc. While not explicitly shown in FIG. 3, memory 130 may be a single type of memory component or may be composed of many different types of memory components. For example, web browser 212 running in location 132 may be part of system 100's cache memory. In addition, memory 130 and CPUs 110 may be distributed across several different computer that collectively comprise system 100. For example, web browser 212 may reside on one computer with CPU, web server application 222 may reside on another computer system with a separate $CPU_2$, Internet/application gateway 332 may reside on a third computer system with a different $CPU_{n-1}$, and software application 342 may reside on a fourth computer with a different $CPU_n$. Computer system 100 of FIG. 3 simply illustrates many of the salient features, without limitation regarding the physical location of CPUs 110 or memory locations within memory 130.

Bus 140 serves to transmit programs, data, status and other forms of information or signals between the various components of system 100. The preferred embodiment for bus 140 is any suitable physical or logical means of connecting computer systems and components known to those skilled in the art. This includes, but is not limited to, direct hard-wired connections, Internet connections, Intranet connections, fiber optics, infrared (IR) and other forms of wireless connections. It is anticipated that many alternative methods and material for connecting computer systems and components will be readily adapted for use with the present invention. This would include those methods and materials not presently known but developed in the future.

Terminal interface 150 allows human users to communicate with system 100, normally through programmable workstation 170. Although system 100 as depicted in FIG. 11 contains only a single workstation 170, it should be understood that the actual number of workstations attached to system 100 will be a function of system design and user preference. Workstation 170 may also be a dumb terminal or other non-programmable computer input/output device which allows human interaction with computer system 100.

Auxiliary storage interface 160 represents any method of interfacing a storage apparatus to a computer system known to those skilled in the art. Auxiliary storage interface 160 allows auxiliary storage devices such as DASD 180 to be attached to and communicate with the other components of system 100. While only one auxiliary storage interface 160 is shown, the present invention anticipates multiple interfaces and multiple auxiliary storage devices such as DASD 180. As shown in FIG. 3, DASD 180 may be a floppy disk drive which is capable of reading and writing programs or data on floppy disk 190. DASD 180 may also be any other type of DASD known to those skilled in the art. This would include CD-ROM drives, hard disk drives, optical drives, etc. Floppy disk 190 represents a typical 3.5 inch magnetic media disk known to those skilled in the art.

The agent using the present invention is pre-approved by a surety company just as the agent is currently pre-approved by one or more surety companies. Under the present invention the agent is not provided with a number of executed power of attorney forms by the surety company as is done with the present system. This avoids the risk of the agent granting unauthorized bonds. As seen in FIG. 1C, the agent inputs the user name and the password to access the system. Once this data is typed, the user may be logged in.

Figure 7:
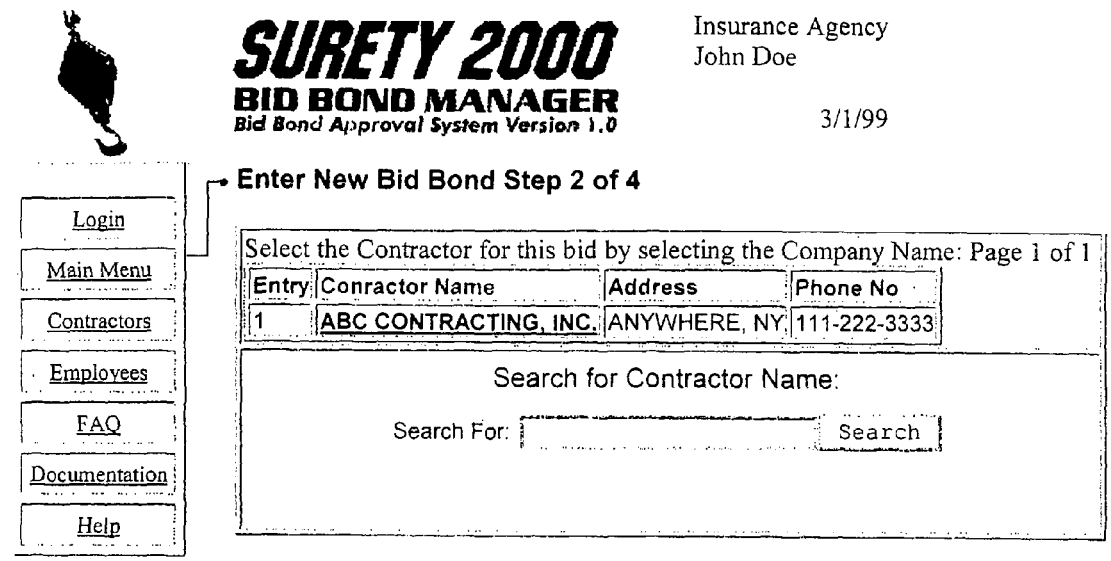
FIG. 7 is a view of step 2, the contractor search, for the preparation of a new bond.

FIG. 2 depicts the main menu which appears after login. The system has identified the user and the date. Once logged in properly the user can navigate any part of the system. Once the agent supplies his or her password and/or account number the agent has access where the agent can obtain a new bond, search for an approved bond, including older bonds, check on the status of a pending bond or search for a dead bond. The system is designed so that the agent will only have access to information only on those bonds which he is authorized to view. In the event the agent seeks a new bond, each bond request is entered into the system by the agency. The information inputted for each new bond typically includes the name of the contractor, its address, the identity of the owner/obligee for whom the bond is required, the bond form required, the owner/obligee's address, the bid date, the estimated contract price, the amount of the bid security, the contract number or IFB number, and a description of the job. A representative screen for a new bond is shown in FIG. 6. Once this information is inputted into the system the bond information the program provides a list of sureties surety where the agent has been authorized and the agent selects the surety from the list. The obligees typically include governmental agencies, private owners, construction managers, and/or general contractors FIG. 8 and FIG. 9. In the event there are more than one contractors with the same name a screen similar to FIG. 7 may appear in order for the choice to be narrowed down to the appropriate selection.

One advantage of the invention is that the surety can rescind the agent's authorization at any time from the website, thus preventing unauthorized bonds being issued. In the event a surety wants to cease doing business with one of its current agent, under the prior system the surety had to recall all of the outstanding powers of attorney and rely on the good faith of the agent to return all the existing executed powers of attorney that the surety had previously provided to the agent. Since an agent is usually dropped by a surety for malfeasance of misfeasance there was always a risk to the surety company as the agent could bind the company to unauthorized obligations with the existing executed powers of attorney. This problem is solved by the present invention since the surety no longer needs to supply the agents with pre-signed powers of attorney and the surety can remove an agent from its list of approved agents virtually instantaneously by access the program and removing the agent's authority. In that event the surety dropping an agent will not be identified as one of the sureties on the list for the agent to select. After selecting the surety, the agent can submit the bond for approval or the information can be retained in the system as a pending bond and can be submitted at a later time.

Once the agent selects the appropriate surety for the particular bid and the agent seeks approval, the agent is given an opportunity to check over the information included for errors. FIG. 10 shows a representative screen for the user to review the key information before the bond is executed. The NAIC code identifies the surety. The date and time to the second can be archived at the time of execution on the screen of FIG. 11. If the information in FIG. 10 is correct then the time of the application is recorded since many obligees require that a bond be obtained prior to a particular deadline and the bid information is transmitted directly to the appropriate person at the surety electronically. A cautionary notice should appear prior to approval of the bond. This warning will query the user to be sure that the bond is to be approved. When the bid information is transmitted to the appropriate person at the surety, that person's computer will provide a message that a bid has been received. This approach avoids the delays inherent in the prior system where facsimile transmissions of the bid information were relied on. Where a facsimile was used, the bid information would be transmitted to the fax machine which was not necessarily near the desk of the person with responsibility to act on the bid application. The agent would then have to wait until the bid was brought from the fax machine location to the surety's appropriate person. This added delays to the system that are avoided using the present invention.

Under the prior system of obtaining bonds once the bond was approved by the surety the agent would then have to put the paperwork together and send it to the contractor. Since the bond was typically not requested by the contractor until just before the deadline delivery to the contractor usually required hand delivery or delivery by overnight courier with all the trouble that weather and other delays can engender. Under the present invention these problems are avoided. Once the bid is approved, the contractor is provided with a code number typically called an authorization code. FIG. 11 is a screen that shows the electronic bond. The contractor places the code on his bid papers and submits them to the obligee at the bid letting. The obligee logs onto the system and provides the contractors authorization code to review the bid. The surety can also use the system to search bonds by number as seen in FIG. 16. The system also permits the surety to view, in real time all of the executed bonds of each agent for quality control purposes. Another advantage for the agent is that the agent can limit access to the system by limiting the individuals who access to the authorization code and/or password. Since the agent can change his password as necessary, the agent has more control over employees and can prevent certain employees from having access to the system. In addition, when an employee leaves employment the agent can change the password without having to worry about unauthorized access to bonds and bond information. FIG. 12 is a contractor information screen for the contractor to input information. FIG. 12A is a screen to search for a contractor. FIG. 13 is a screen for the agency to input employee information for the employee to have authority to issue bonds. Initially, once the surety approves of the agent one key person at the agency will be the authorized person at the agency for all bonds. This may be the owner manager or some other person. This key person can, if desired, grant sub-authorizations to other employees that permit these additional persons to issue bonds. The number of these sub-authorizations may be increased, decreased or terminated completely as needed. This authority can be readily cancelled if any impropriety is uncovered. FIG. 14 shows a representative screen for the authorized employee of the agency to fill out to have access to the system. FIG. 15 is a representative example of the log in page for the owner/obligee to access all the bonds information. For example, the name of the organization for whom the bonds were issued may be inserted and information on all of the selected executed bonds is accessed. No changes or transactions may be made to the bonds.

Figure 5:
FIG. 5 is a view of a representative pending bond page for the system.

In FIG. 3 an example of a screen for a user to search pending bonds is shown. The name of the contractor or the name of the owner/obligee is inserted and a search may be performed. In the event all pending bonds are to be searched, the fields are left blank and the user merely clicks the search box. FIG. 4 shows an example of a listing of bonds in chronological order by the bid date. The list may be used as a daily or other work list of the bonds to be approved. The appropriate surety company can see the pending bond and accept it as a bid bond request. FIG. 5 shows the screen for a pending bid bond. The screen lists all the necessary information in order for it to be approved. FIG. 17 is an example of the electronic bid bond of the present invention. The exact date and time of the bid bond approval is archived. The name of the surety and the surety's NAC code is identified. This code designates the exact surety and avoids the confusion of similar surety names. The name of the person who executed the bid bond is at the bottom. This form can be modified so that the necessary information for each jurisdiction is available.

Figure 18:
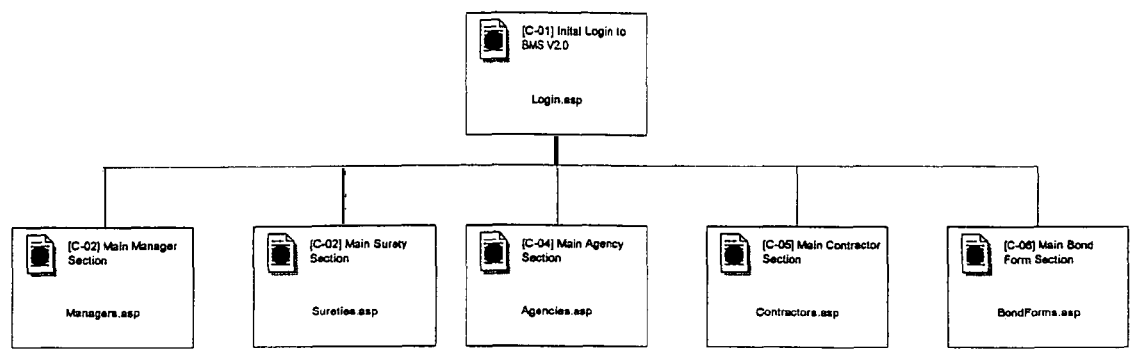
FIG. 18 is a flow chart showing the main client navigation.

FIGS. 18-42 show an alternate embodiment of the present invention. FIG. 18 is a flow chart showing the main client navigation.

[C-01] Initial Login to BMS V2.0

The login requires the Manager, Surety, Agency, Principal or Contractor to enter their Company ID, Username and password. The username and password are encrypted and stored within the database. The representative login dialog appears in FIG. 19

[C-02] Main Manager Section

If the user has manager access, the user will have the choice of adding a manager or searching for viewing existing managers by name

[C-03] Main Surety Section

If the user has Surety access, the user will have the choice of adding a Surety or searching for viewing existing Sureties by name

[C-04] Main Agency Section

If the user has Agency access, the user will have the choice of adding an Agency or searching for viewing existing Agencies by name

[C-05] Main Contractor Section

If the user has Contractors access, the user will have the choice of adding a Contractor or searching for viewing existing Contractors by name

[C-06] Main Bond Form Section

Lists all of the Bond forms for the company that the user logged in belongs to.

Managers [CM-01 Thru CM-04]

Figure 20:
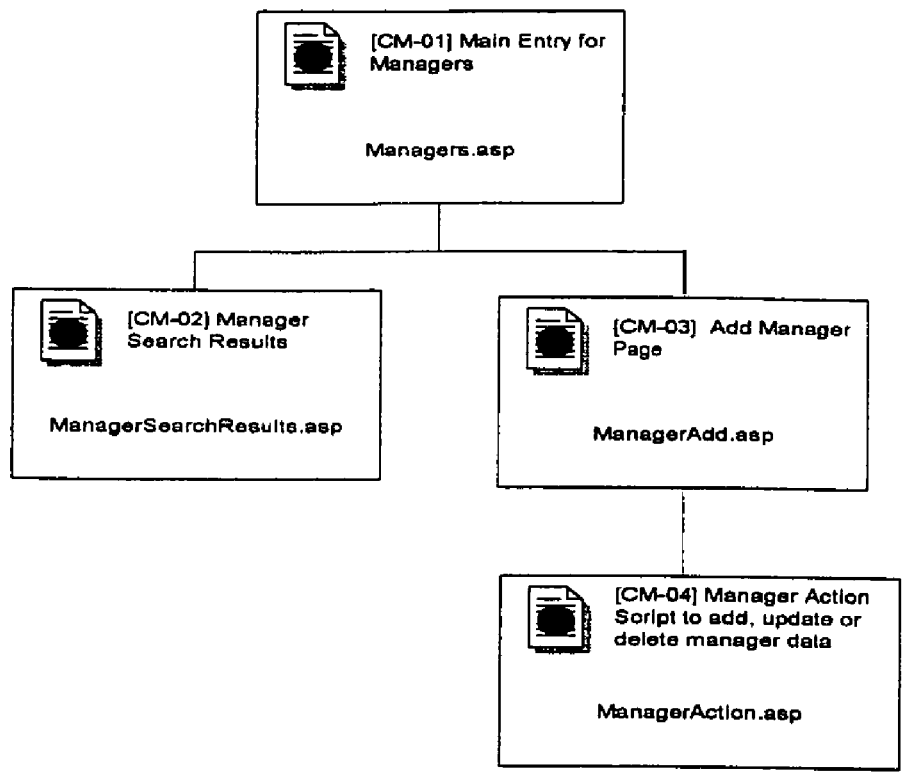
FIG. 20 is a flow chart showing the Managers section of the program.
Figure 21:
FIG. 21 is a representative Manager's information form.

FIG. 20 is a flow chart showing the Managers section of the program.

[CM-01] Main Entry for Managers

If the user has manager access, the user will have the choice of adding a manager or searching for viewing existing managers by name.

[CM-02] Manager Search Results

Allows Managers to search managers within their company by first letter or by name. The user can also delete the manager's information from this page.

[CM-03] Add Manager Page

Allows users with mangers access to add managers within their company. The representative Manager's information form appears in FIG. 21.

[CM-04] Manager Action Script to add, update or delete manager data

Called by the add manager above to execute additions, updates or deletions.

Sureties [CS-01 Thru CS-18]

Figure 22:
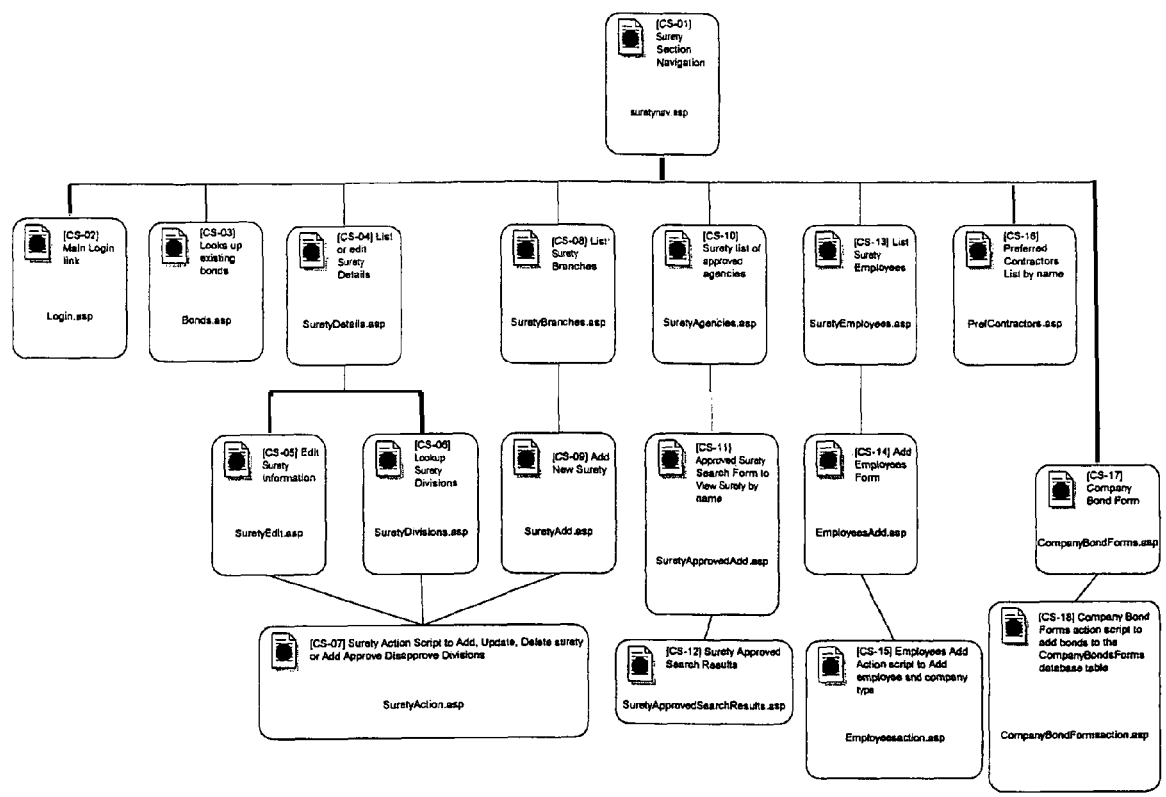
FIG. 22 shows a flow chart for the Sureties section of the program.
Figure 23:
FIG. 23 shows a representative update form.
Figure 25:
FIG. 25 shows a representative form to add a surety

FIG. 22 shows a flow chart for the Sureties section of the program

[CS-01] Surety Section Navigation

If the user has surety access, the user will have the choice of adding a surety or searching for viewing existing surety by name

[CS-02] Main Login link

The login requires the Manager, Surety, Agency, Principal or Contractor to enter their Company ID, Username and password. The username and password are encrypted and stored within the database.

[CS-03] Bond Lookup

This page contains scripts needed to look up existing sureties and branches tied to the company ID of the logged in user.

[CS-04] List Surety Details

Allows the listing of surety details. This includes surety divisions and branches listed under the parent surety.

[CS-05] Edit Surety Information

Form used to update existing surety information. Representative update form appears in FIG. 23.

[CS-06] Add Surety Divisions

Contains form to add surety divisions. Representative form used to add divisions appear in FIG. 24.

[CS-07] Surety Action Script to Add, Update, Delete surety or Add, Approve, Disapprove Divisions This page is used to house scripts used to add, update, delete surety of add, approve, disapprove divisions

[CS-08] List Surety Branches

Form and logic used to display surety branches. The page also has an Add branches capability.

[CS-09] Add New Surety

Used to add a new surety. Representative form appears in FIG. 25.

[CS-10] Surety List of Approved Agencies

The user can list and select approved agencies from this page. The user can also view the agency, the division that the agency is in and the approved limit for that agency. New agencies can be added and existing agencies can be edited or removed.

[CS-11] Approved Surety Search Form to View Surety by Name

Search form to View Approved Surety by Name.

[CS-12] Surety Approved Search Results

View search results for the view approved surety by name search.

[CS-13] List Surety Employees

Displays list of employees and their access level within the system. The access types are listed as administrator, Executive or Clerical.

[CS-14] Add Employees Form

Figure 26:
FIG. 26 depicts a representative form to add new employees of the surety to the system.

The add employees form is used to add new employees of the surety to the system. A representative form is shown in FIG. 26

[CS-15] Employees Add Action Script to Add Employee and Company Type

This script adds employees for all entities within the system (Agency, Principle, Contractors and Managers. It also checks for duplicate users within the system.

[CS-16] Preferred Contractors List by Name

Lists all preferred contractors for the logged in surety

[CS-17] Company Bond Form

Presents the appropriate bond form for the surety or agency

[CS-18] Company Bond Forms Action Script to Add Bonds to the Company Bonds Forms Database Table Script used by the company bond form to add bonds to the system.

Agencies [CA-01 Thru CA-18]

Figure 27:
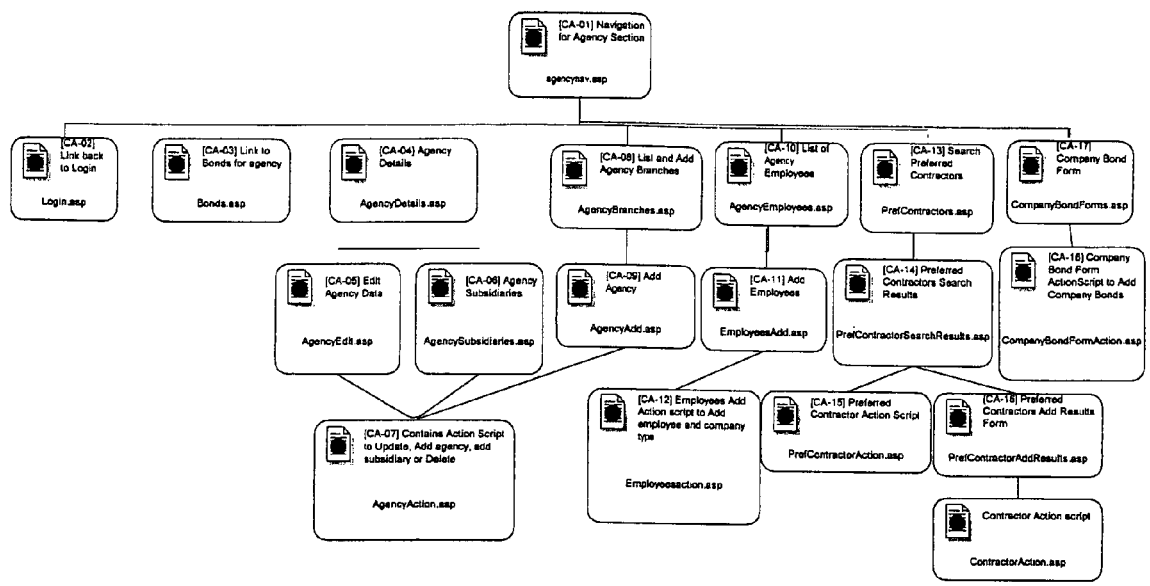
FIG. 27 shows a flow chart for the Sureties section of the program
Figure 28:
FIG. 28 shows a representative form to update Agency information.

FIG. 27 shows a flow chart for the Sureties section of the program

[CA-01] Navigation for Agency Section

If the user has Agency access, the user will have the choice of adding an Agency or searching for viewing existing Agencies by name

[CA-02] Link back to Main Login

The login requires the Manager, Surety, Agency, Principal or Contractor to enter their Company ID, Username and password. The username and password are encrypted and stored within the database.

[CA-03] Bond Lookup

This page contains scripts needed to look up existing sureties and branches tied to the company ID of the logged in user.

[CA-04] Agency Details

Lists details of the agency such as Company name, Subsidiaries, Employees, Employee permissions and branches.

[CA-05] Update Agency Data

Contains form to update Agency information. A representative form used appears in FIG. 28:

[CA-06] Agency Subsidiaries Add and Lookup

Lists agency subsidiaries and provides a form to add subsidiaries. A representative add subsidiaries form appears in FIG. 29:

[CA-07] Contains Action Script to Update, Add Agency, add Subsidiary or Delete

Uses input from the subsidiaries form above. Also is used to add or delete agencies and subsidiaries.

[CA-08] List and Add Agency Branches

This is used to list or add agency branches

[CA-09] Add Agency or Branches

Form used to add an agency or branches.

[CA-10] List of Agency Employees

Returns a list of agency employees

[CA-11] Employee Add Form

The add employees form is used to add new employees of the surety to the system. A representative form appears in FIG. 30.

[CA-12] Employees Add Action Script to Add Employee and Company Type

This script adds employees for all entities within the system (Agency, Principle, Contractors and Managers. It also checks for duplicate users within the system.

[CA-13] Search Preferred Contractors

Used to list preferred contractors by name

[CA-14] Preferred Contractors Search Results

Formats the above preferred contractor search results. Allows user to add preferred contractors as well. The form uses the federal tax id as the key for the search. The representative preferred contractor form appears in FIG. 31:

[CA-15] Preferred Contractor Action Script

This page contains scripts used to update the contractor, add the contractor or delete the contractor. This script also builds the contractor ID.

[CA-16] Preferred Contractors Add Results Form

Returns a list of preferred contractors in the system. User may also add preferred contractors from this form

[CA-17] Company Bond Form

Presents the appropriate bond form for the surety or agency

[CA-18] Company Bond Forms Action Script to Add Bonds to the Company Bonds Forms Database Table Script used by the company bond form to add bonds to the system.

Contractors Area [CC-01 Thru CC-07]

Figure 32:
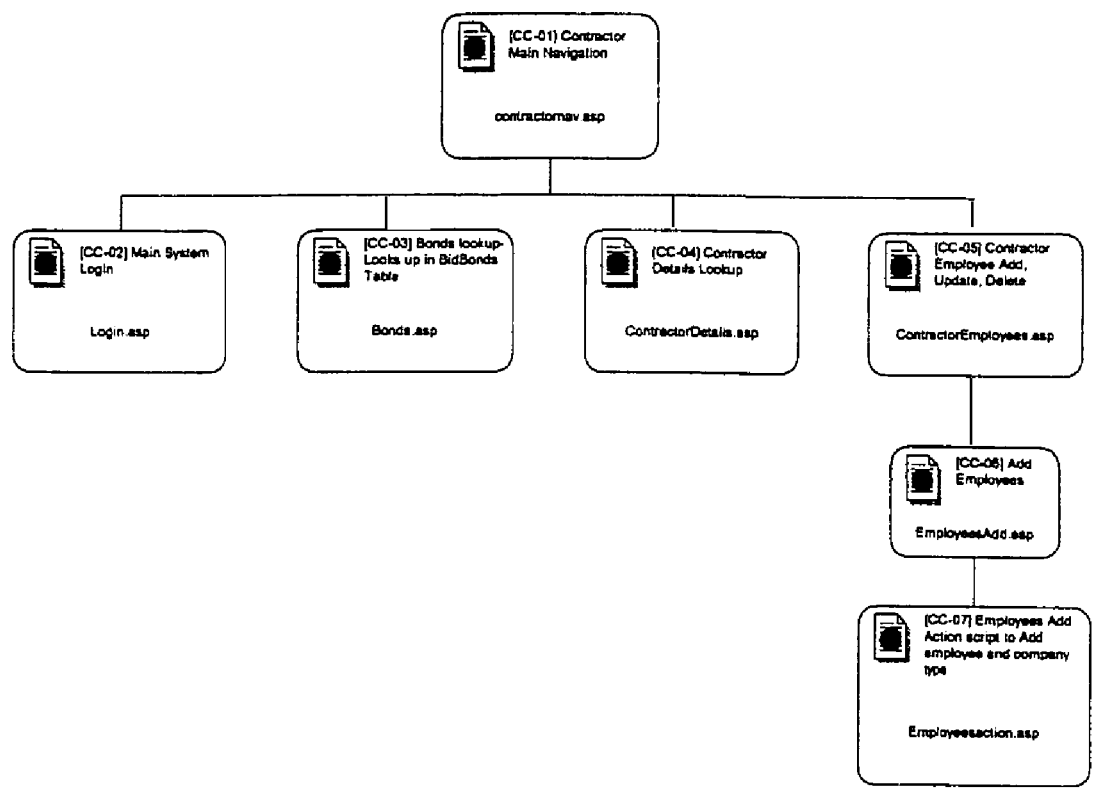
FIG. 32 show a representative flow chart for the contractors section of the program.

FIG. 32 show a representative flow chart for the contractors section of the program.

[CC-01] Contractor Main Navigation

If the user has Contractors access, the user will have the choice of adding a Contractor or searching for viewing existing Contractors by name.

[CC-02] Main System Login

The login requires the Manager, Surety, Agency, Principal or Contractor to enter their Company ID, Username and password. The username and password are encrypted and stored within the database.

[CC-03] Bonds lookup-Look up in Bid Bonds Table

This page contains scripts needed to look up existing sureties and branches tied to the company ID of the logged in user.

[CC-04] Contractor Details Lookup

Lists details of the contractor information such as Company name and address.

[CC-05] Contractor Employee Add, Update, Delete

Figure 33:
FIG. 33 shows a representative form used to Add a Contractor.

Representative form used to Add Contractor is shown in FIG. 33.

[CC-06] Employee Add Form

The add employees form, a representative format which is shown in FIG. 34, is used to add new employees in to the system.

[CC-07] Employees Add Action Script to Add Employee and Company Type

This script adds employees for all entities within the system (Agency, Principle, Contractors and Managers. It also checks for duplicate users within the system.

Owners/Obligee Area [CO-01 Thru CO-07]

Figure 35:
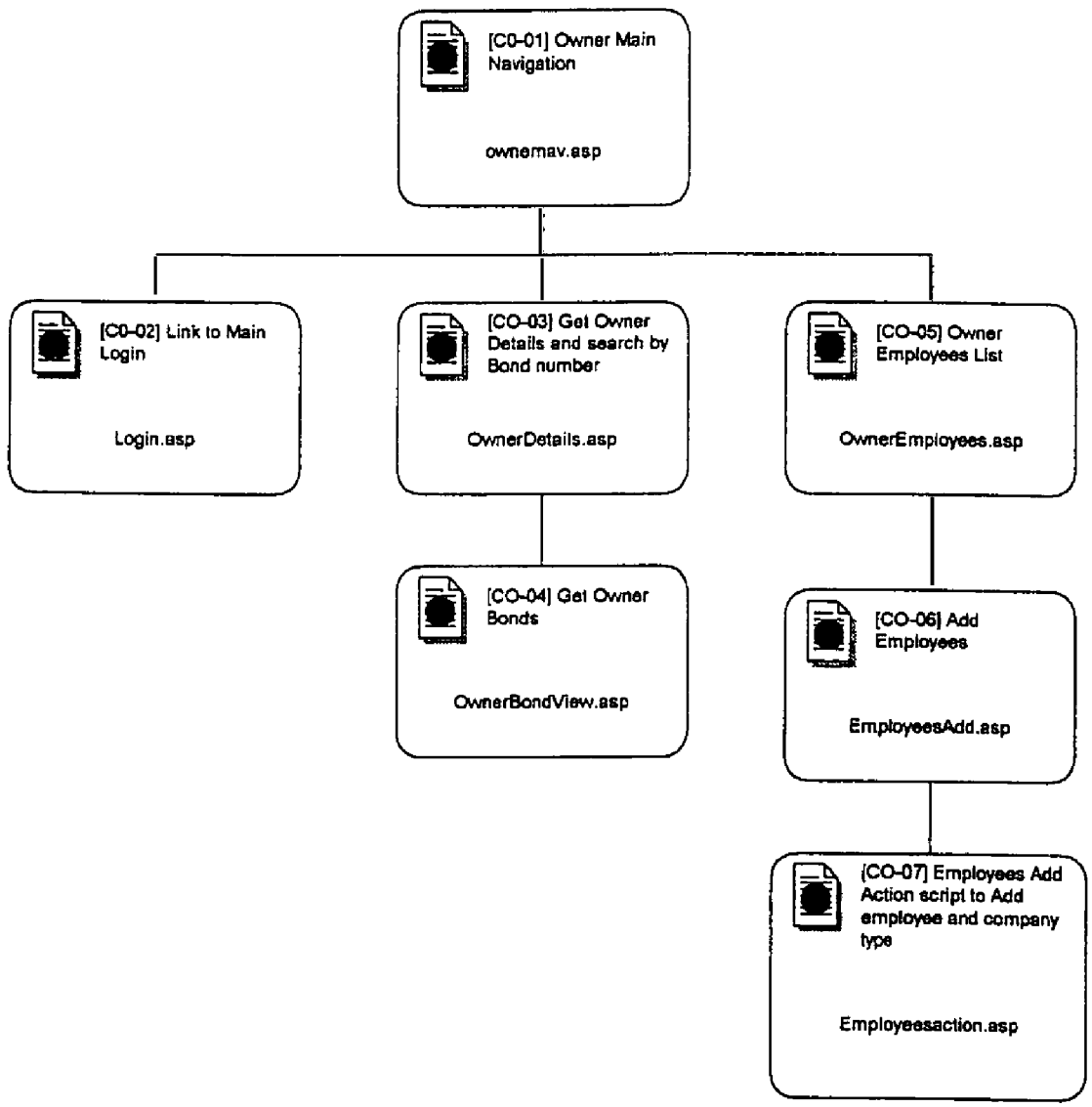
FIG. 35 show a representative flow chart for the owners/ obligee section of the program.

FIG. 35 show a representative flow chart for the owners/obligee section of the program.

[CO-01] Owner Main Navigation

Main navigation for users logged in as owners.

[CO-02] Main System Login

The login requires the Manager, Surety, Agency, Principal or Contractor to enter their Company ID, Username and password. The username and password are encrypted and stored within the database.

[CO-03] Get Owner Details and Search by Bond Number

Lists details of the contractor information such as Company name and address. This form also allows the user to search by bond number

[CO-04] Get Owner Bonds

List bonds for the logged in owner.

[CO-05] Owner Employees List

Lists the employees for the owner obligee.

[CO-06] Employee Add Form

Figure 36:
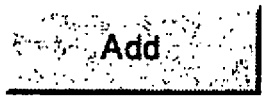
FIG. 36 shows an add employees form used to add new employees of the owners/obligees into the system.

The add employees form, a representative sample of which is shown in FIG. 36, is used to add new employees in to the system.

[CC-07] Employees Add Action Script to Add Employee and Company Type

This script adds employees for all entities within the system (Agency, Principle, Contractors and Managers. It also checks for duplicate users within the system.

Bond Forms [CB-01-CB-16]

[CB-01] Bond Main Navigation

Figure 37:
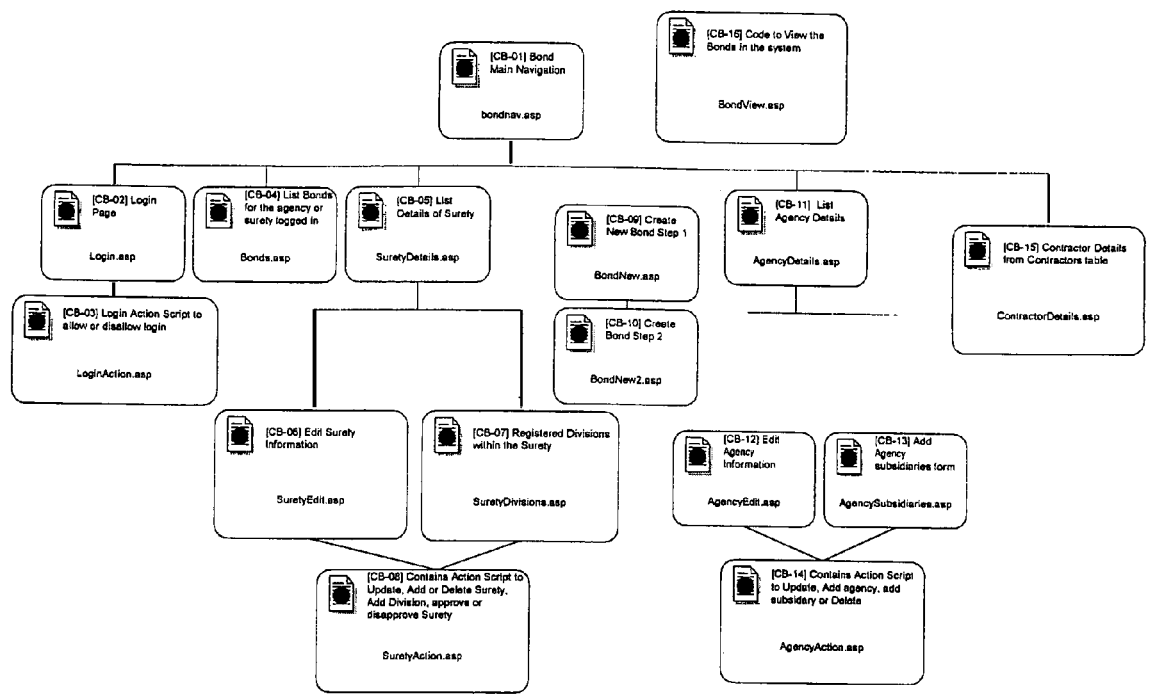
FIG. 37 shows a representative flow chart for the bonds.
Figure 40:
FIG. 40 shows a representative form that may be used to update agency information.

A representative flow chart for the bonds for is shown in FIG. 37.

[CB-02] Main System Login

The login requires the Manager, Surety, Agency, Principal or Contractor to enter their Company ID, Username and password. The username and password are encrypted and stored within the database

[CB-03] Login Action Script to Allow or Disallow Login

This scripts decides system login authentication logic then, directs the user to the appropriate area.

[CB-04] List Bonds for the Agency or Surety Logged In

Page Returns bonds for the agency or surety logged in

[CB-05] List Details of Surety

Allows the listing of surety details. This includes surety divisions and branches listed under the parent surety.

[CB-06] Edit Surety Information

Form used to update existing surety information. A representative update form is shown in FIG. 38.

[CB-07] Add Surety Divisions

Contains form to add surety divisions. A representative form used to add divisions appears in FIG. 39.

[CB-08] Surety Action Script to Add, Update, Delete Surety or Add, Approve, Disapprove Divisions This page is used to house scripts used to add, update, delete surety of add, approve, disapprove divisions

[CB-09] Create New Bond Step 1

Search for a preferred contractor
New Bond Step 1: Search for a Preferred Contractor
View Preferred Contractors By Name

[CB-10] Create Bond Step 2

New Bond Step 2: Select Preferred Contractor from returned list.

[CB-11] Bond Step 3: Enter Bond Information

[CB-11] List Agency Details

Lists details of the agency such as Company name, Subsidiaries, Employees, Employee permissions and branches

[CB-12] Update Agency Data

Contains form to update Agency information. A representative form that may be used appears in FIG. 40:

[CB-13] Agency Subsidiaries Add and Lookup

Lists agency subsidiaries and provides a form to add subsidiaries. The representative add subsidiaries form appears in FIG. 41:

[CB-14] Contains Action Script to Update, Add Agency, Add Subsidiary or Delete

Uses input from the subsidiaries form above. Also is used to add or delete agencies and subsidiaries

[CB-15] Contractor Details from Contractors Table

Lists contractor information from related to this particular bond.

[CB-16] Code to List and View the Bonds in the System

This code will list and display completed bonds in the system.

4.2 Server [S-01 Thru S-0X]

[S-01] Server login—During the client login, the username and password are looked up in the database and granted or denied access depending on the user's account status

[S-02] The Database server is preferably running Microsoft SQL Server 7.0.

Figure 42:
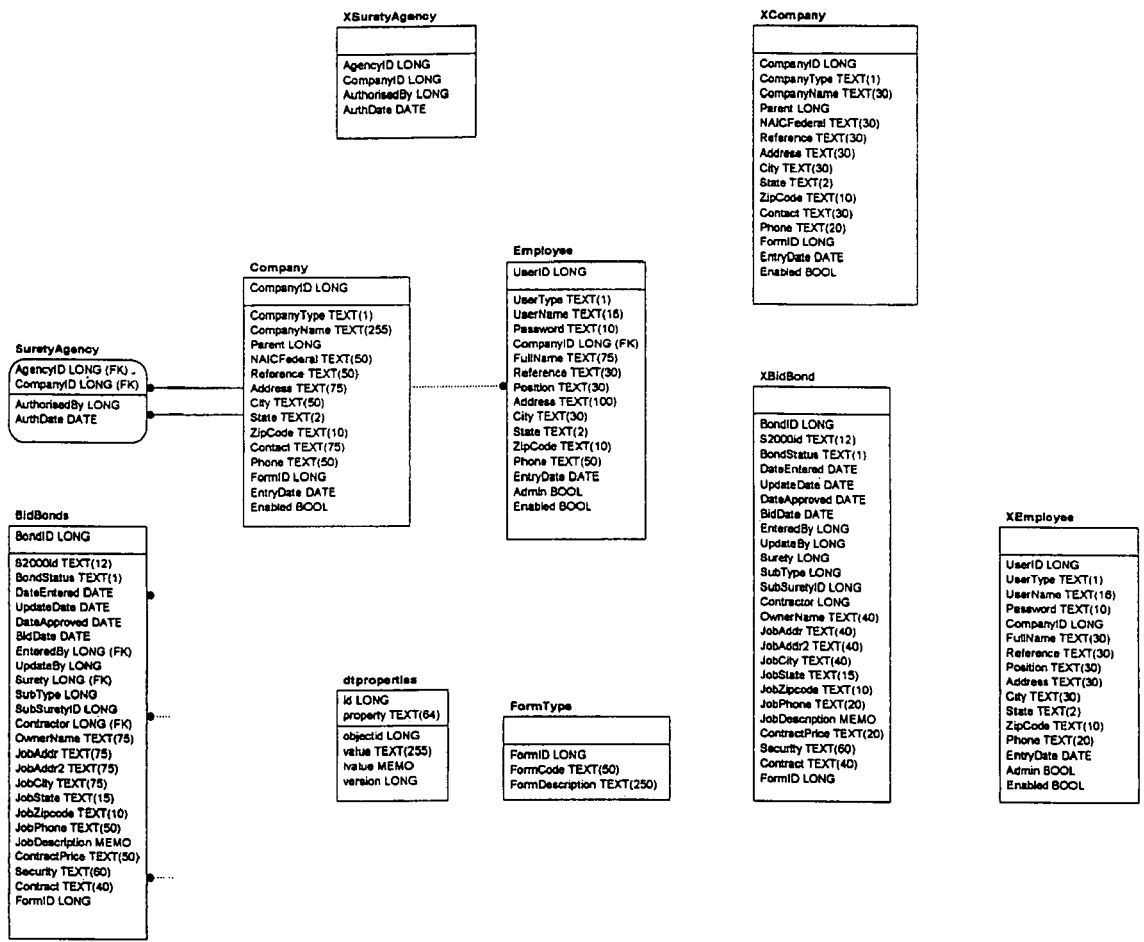
FIG. 42 depicts a representative Database table layout.

[S-03] A representative database table layout appears in FIG. 42.

SECURITY

Preferably the databases are encrypted with 128 bit key encryption and the databases contain a specified list of users and specific roles the user has in the database. Preferably, the users each have a unique user name and password and the users are able to view only the sections specified In addition to the use of the present invention for bonds, those skilled in the art can also use the teachings of the invention for obtaining proof of insurance. Certificates of Insurance are also frequently required by contractors and others. Contractors are frequently required to present proof that their workers are covered by for example worker's compensation insurance. Certificates of Insurance are also required by many states before an automobile is registered. The present invention is useful in these applications also. One of the major advantages off the present invention is the reduction of fraud. In addition, there are significant cost reductions in the manner in which these insurance products are prepared pursuant to the teachings of the present invention.

I claim:

1. A computer usable medium having stored thereon computer-executable instructions for causing a computer system to execute a method of obtaining one of a variety of forms of bonds, said method comprising:

receiving and storing information about a contractor, said information comprising information that is required by one or more sureties to issue said bond, said information being transmitted over a network connection from a contractor workstation;

receiving and storing owner/obligee information required by said surety to issue said bond, said owner/obligee information being transmitted over said network from said contractor workstation;

generating a list of sureties from said one or more sureties, said list of sureties comprising one or more sureties that have authorized said contractor to submit one or more bond applications thereto;

sending said list of sureties over said network connection to said contractor workstation;

receiving and storing a selection of a surety from said list of sureties, said selection being made by said contractor from said contractor workstation;

generating a list of bond forms said contractor is authorized to submit to each surety on said list of sureties;

sending said list of authorized bond forms to said contractor workstation over said network;

receiving and storing a selection of a bond form from said authorized bond forms using said client workstation;

receiving a request from said contractor workstation, said request being received by said selected surety, said request seeking approval of a bond application over said network, said bond application comprising transmitting of all information required by said selected surety;

establishing a second network connection with a second workstation, said second workstation being accessible by an agent acting on behalf of said selected surety, said agent having access to said received bond application, said agent granting or denying said bond application.

2. A method implemented by a computer system server for obtaining a variety of types of bonds comprising:

receiving, by the computer system server, information on a contractor that is required by a surety to issue a bond, said information being received on said server from a contractor workstation over a network connection;

receiving, by the computer system, owner/obligee information required by said surety to issue said bond, said owner/obligee information being received from said contractor workstation over said network connection;

identifying, by the computer system, one or more sureties said contractor has been authorized to obtain bonds from;

transmitting, by the computer system, said identified sureties to said contractor workstation over said network connection;

receiving, by the computer system, a selection of a surety from among said identified sureties, said selection being received from said contractor workstation over said network connection;

identifying, by the computer system, one or more bond forms said contractor has been authorized by said selected surety to submit;

transmitting, by the computer system, said identified bond forms to said contractor workstation over said network connection;

receiving, by the computer system, a selection of a bond form from said identified bond forms, said selection being sent from said contractor workstation over said network connection;

receiving, by the computer system, a request for approval of said selected bond form from said contractor workstation over said network station;

transmitting, by the computer system, said required contractor and owner/obligee information and said selected bond form to said selected surety, said selected surety comprising an agent acting on behalf of said selected surety, said agent rendering a decision on said selected bond form over a second network connection.

3. A method of obtaining a bond from among a variety of types of bonds comprising:

receiving, through a computer system, information on a contractor that is required by a surety to issue a bond, said information being transmitted by a computer operated by said contractor, said information being transmitted over a communication network;

receiving, through said computer system, owner/obligee information required by said surety to issue said bond, said owner/obligee information being transmitted by said computer operated by said contractor and being transmitted over said communication network;

identifying, through said computer system, one or more sureties said contractor has been authorized to obtain bonds from;

transmitting, through said computer system, said identified sureties to said computer operated by said contractor, said identified sureties being transmitted over said communication network;

receiving, through said computer system, a selection of a surety by said contractor, said selection being sent from said computer operated by said contractor over said communication network;

identifying, through said computer system, one or more bond forms said contractor has been authorized to submit to said selected surety;

transmitting, through said computer system, said identified bond forms to said computer operated by said contractor over said communication network;

receiving, through said computer system, a selection of a bond form by said contractor, said selection being sent from said computer operated by said contractor over said communication network;

processing, through said computer system, a request for approval of said bond form by said contractor, said request being sent from said computer operated by said contractor and being sent over said communication network, said request comprising said information required by said selected surety and said selected bond form;

receiving, through said computer system, a decision on said bond request over said communication network.

4. The method according to claim 3 wherein after said computer system has received a decision on said bond request, said contractor is provided with an authorization code that may be presented at a bid letting along with a contractor's bid, said authorization code permitting an owner/obligee to view an approved bond through said communication network.

5. The method according to claim 3 wherein said bond is a surety bond from the group of bond types consisting of: a bid bond, a contract bond, a court bond, a subdivision bond, a performance bond, a customs bonds, a notary bond, a liquor license bond, a license bond, a permit bond, a small business administration bond, a bail bond, a supersedeas bond, or a litigation bond.

6. The method according to claim 3 wherein said communication network is accessed by a password.

7. An apparatus for obtaining one of a variety of types of bonds comprising:

a central processing unit; a bus communicably linked to said central processing unit; memory communicably linked to said bus; said memory comprising a computer usable medium; said computer usable medium having a computer readable program code embodied therein, said code communicably linking said bus of said apparatus to a storage device of a client workstation via a communication network;

said code directing said bus to transfer information on a contractor that is required by a surety from said storage device of said contractor workstation to said memory of said apparatus via said communication network;

said code directing said bus to transfer owner/obligee information concerning said bond from said storage device of said contractor workstation to said memory of said apparatus via said communication network;

said code directing said central processing unit to generate a list of sureties authorized to issue bonds to said contractor;

said code directing said bus to transfer said list of sureties from said memory of said apparatus to said storage device of said contractor workstation via said communication network;

said code directing said bus to transfer a selection of a surety from said list, said selected surety being transmitted from said storage device of said contractor workstation to said memory of said apparatus via said communication network;

said code directing said central processing unit to generate a list of bond forms said user has been authorized to request from said selected surety;

said code directing said bus to transfer said list of bond forms to said storage device of said contractor workstation via said communication network;

said code directing said bus to transfer a selection of a bond form from said list, said selection being transferred from said storage device of said contractor workstation to said memory of said apparatus via said communication network;

said code directing said bus to transfer a request for approval of said bond by said contractor, said request being transferred from said storage device of said contractor workstation to said memory of said apparatus via said communication network;

said code directing said bus to transfer all information received from said storage device of said contractor workstation relating to said bond request to a storage device of a computer accessible by an agent acting on a surety's behalf, said transfer being via said communication network.

8. A method implemented by a computer system for obtaining a variety of types of bonds comprising:

receiving, by the computer system, information on a contractor that is required by a surety to issue a bond from a contractor workstation over a network connection;

receiving, by the computer system, owner/obligee information required by said surety from said client workstation over said network connection;

generating, by the computer system, a list of sureties said contractor has been authorized to obtain bonds from;

transmitting, by the computer system, said list of sureties to said contractor workstation over said network;

receiving, by the computer system, a selection of a surety sent from said contractor workstation over said network;

generating, by the computer system, a list of types of bond forms said contractor has been authorized by said surety to request;

transmitting, by the computer system, said list of types of bond forms to said contractor workstation over said network connection;

receiving, by the computer system, a selection of a bond form sent from said client workstation over said network connection;

receiving, by the computer system, a request for approval of said bond form from said client workstation over said network;

transmitting, by the computer system, said required contractor information and said required owner/obligee information over said network connection to a computer system accessible by an agent acting on behalf of said surety.

9. A method implemented by a computer system for obtaining a variety of types of bonds comprising:

receiving, by the computer system, information on a contractor that is required by said surety to issue a bond from a contractor workstation over a network connection;

receiving, by the computer system, owner/obligee information required by said surety over said network connection;

identifying, by the computer system, a surety authorizing said contractor to obtain bonds therefrom;

transmitting, by the computer system, said identified surety to said contractor workstation over said network connection;

identifying, by the computer system, one or more bond forms said contractor has been authorized by said surety to submit;

transmitting, by the computer system, said identified bond forms to said contractor workstation over said network connection;

receiving, by the computer system, a selection of a bond from sent from said contractor workstation over said network connection;

receiving, by the computer system, a request for approval of said selected bond from said client workstation over said network connection, said request comprising transmitting said information required by said selected surety.

10. An integrated process of processing an application and issuing a surety bond, from a surety or an agent of one or more sureties to a contractor, for the benefit of an obligee, using a computer system, said integrated process comprising the following steps:

using one or more processors to execute instructions retained in a machine-readable storage media to cause said computer system to cause the display of one or more screens for use in executing said process;

storing, in a memory in said computer system, a list of one or more bond types;

storing, in said memory, a list of one or more sureties for which an agent has been authorized to issue bonds, said list comprising one or more sureties;

requesting, by said contractor from said agent, of a bond type from among said list of one or more bond types and a bond amount, to begin said application;

selecting, by said agent, of one surety from a screen displaying said list of one or more sureties;

selecting, by said agent, of said requested bond type from said screen, said screen displaying said list of bond types;

inputting into a portion of said screen, contractor information and obligee information required by said selected surety for an application for issuance of said requested bond type;

reviewing, by said selected surety or by said agent of said selected surety, of said application;

dispositioning, by said selected surety or by said agent of said selected surety, of said application for said requested bond type, where said dispositioning comprises approving or disapproving of said application, and wherein said approval comprises issuing and displaying of an authorization code to said contractor;
submitting, by said contractor, of said authorization code to said obligee; and
verifying, by said obligee, said approval of said application by using said authorization code to result in displaying of said approved bond.

11. An integrated process of processing an application and issuing a surety bond according to claim 10, wherein when said bond amount exceeds threshold amount, said bond request is approved only after said agent transmits said requested bond type and said inputted information to said selected surety for approval.

12. An integrated process of processing an application and issuing a surety bond according to claim 11, wherein a decision on whether said bond is approved is made by said surety responding to said request on said computer system, after said request is received.

13. An integrated process of processing an application and issuing a surety bond according to claim 12, wherein said authorization code is transmitted by said computer system to said contractor.

14. An integrated process of processing an application and issuing a surety bond according to claim 13, wherein said approval further comprises recording a date and time of said approval, to confirm timely compliance by said applicant with a deadline set by said obligee.

15. An integrated process of processing an application and issuing a surety bond according to claim 14, wherein said computer system comprises a contractor computer, an agent computer, and a surety computer, said agent computer being coupled to communicate with said contractor computer and said surety computer; and wherein said transmitting of said request for said bond by said contractor to said agent comprises transmitting said request from said contractor computer to said agent computer.

16. An integrated process of processing an application and issuing a surety bond according to claim 15, wherein said transmitting of said request for approval by said agent to said surety comprises transmitting said request from said agent computer to said surety computer.

17. An integrated process of processing an application and issuing a surety bond according to claim 16, wherein said computer system further comprises an obligee computer, said obligee computer being coupled to communicate with one or more of: said contractor computer and said agent computer; and wherein said contractor submission of said authorization code to said obligee comprises submitting said authorization code from either of said contractor computer and said agent computer, to said obligee computer.

18. An integrated process of processing an application and issuing a surety bond according to claim 17, wherein said instructions retained in said machine-readable media are stored in a memory on a server, and wherein said contractor computer, said agent computer, said surety computer, and said obligee computer are coupled to communicate through said server.

19. An integrated process of processing an application and issuing a surety bond according to claim 18, wherein said communication is by a network connection, said network connection comprising one or more of: a local area network connection, and an internet connection.

20. An integrated process of processing an application and issuing a surety bond according to claim 19, wherein said server comprises a web server, and wherein said web server stores said applicant inputted information, said selected bond type, and said authorization code.

21. An integrated process of processing an application and issuing a surety bond according to claim 20, wherein said obligee verification of said approval comprises accessing said web server from said obligee computer and inputting said authorization code to view said approval of said requested bond type.

22. An integrated process of processing an application and issuing a surety bond according to claim 17, wherein said agent response to said request for approval of said bond application is permitted on behalf of said surety by using one or more passwords controlled by said surety.

23. An integrated process of processing an application and issuing a surety bond according to claim 22, wherein said instructions further comprise providing a screen permitting each of said one or more sureties to assign exclusive use of a password to said agent; and wherein said agent uses said exclusively assigned password to approve or disapprove said bond application on behalf of said surety.

24. An integrated process of processing an application and issuing a surety bond according to claim 23, wherein said contractor submitting said authorization code to said obligee comprises placing said authorization code on a bid presented to said obligee at bid letting.

25. An integrated process of processing an application and issuing a surety bond according to claim 24, wherein said instructions provide a screen permitting only said surety to view and/or approve responses by said agent of said surety.

26. An integrated process of processing an application and issuing a surety bond according to claim 25, wherein said exclusively assigned password by said surety can be cancelled to rescind said agent's authorization to approve said request by said contractor for said bond.

27. An integrated process of processing an application and issuing a surety bond according to claim 26, wherein said required information to be inputted for said bond application comprises one or more of: a name and address of said contractor, a name and address of said obligee, a bid date, an estimated contract price, a bid security amount, a job description, and one or more of: a contract number and an IFB number.

28. An integrated process of processing an application and issuing a surety bond according to claim 27, wherein said one or more bond types is from the group of bond types consisting of: a bid bond, a contract bond, a court bond, a subdivision bond, a performance bond, a customs bonds, a notary bond, a liquor license bond, a license bond, a permit bond, a small business administration bond, a bail bond, a supersedeas bond, or a litigation bond.

29. An integrated process of processing an application and issuing a surety bond according to claim 28, wherein said selected surety is selected from a list box in said screen wherein said requested bond type is selected from a second list box in said screen; and wherein said required contractor information and obligee information is inputted into an information box in said screen.

30. A computer readable medium having stored thereon instructions that, when executed, direct a computer system to display one or more screens to accommodate a process of issuing a surety bond, from a surety or from an agent of a surety, to a contractor, for the benefit of an obligee, said process comprising the following steps:
pre-approving one or more agents, by one or more surety companies, for access to said computer system, said pre-approved access comprising authorization to issue bonds on behalf of each respective one or more surety companies; and storing said pre-approval in a memory in said computer system;

storing, in said memory in said computer system, a list of bond types;

requesting, by said contractor, of a bond type and a bond amount, using one of said preapproved agents;

accessing, by said agent, of said computer system;

entering, by said agent, of said request; said entering of said request comprising the steps of:

selecting a surety from a screen being capable of displaying said stored list of sureties for said contractor;

selecting said bond type from said screen, said screen being capable of displaying said stored list of bond types; and inputting, into a portion of said screen, contractor information and obligee information required for issuance of said requested bond type;

dispositioning of said entered bond request, by said surety or said agent of said surety, said dispositioning comprising reviewing of said request and approving or disapproving of said bond request; and wherein when said dispositioning results in approving said bond request:

providing a bond authorization code to said contractor;

submitting, by said contractor, of said authorization code to said obligee; and verifying, by said obligee, of said approval of said bond by entering of said authorization code into said computer system to cause display of said approved bond.

31. A computer readable medium according to claim 30, wherein said one or more screens to accommodate said process further comprise recording of a date and time of said bond approval.

32. A computer readable medium according to claim 30, wherein said one or more screens to accommodate said process further comprises requesting one or more of: a password and an account number, from said pre-approved agent, prior to permitting said accessing by said agent; and wherein either or both of said password and account number are given to said agent by said surety during said pre-approving.

33. A computer readable medium according to claim 32, wherein said one or more screens to accommodate said process further comprises said agent granting one or more sub-authorizations to employees of said agent, said one or more sub-authorizations permitting said employees to access said computer system to enter said bond requests; and wherein said granting of sub-authorizations comprises a screen for said agent to input information of said employees.

34. A computer readable medium according to claim 33, wherein said one or more screens to accommodate said process further comprises one or more of: a screen to permit said surety to rescind said authorization of said agent at any time by invalidating said password; and a screen to permit said employee sub-authorizations to be terminated by said agent at any time.

35. A computer readable medium according to claim 30, wherein said one or more screens to accommodate said process further comprises a screen to permit said dispositioning to further comprise retaining said bond request in a memory as a pending bond, to thereby defer said approval or disapproval.

36. A computer readable medium according to claim 35, wherein said one or more screens to accommodate said process further comprises a screen to permit said agent to search for one or more of: a previously approved bond, a dead bond, and a pending bond; and wherein said pre-approved access of said agent comprises access only to bonds requested by said agent.

37. A computer readable medium according to claim 30, wherein said information screen permits input of said required information by said agent, wherein said information comprises one or more of: a name of said contractor, an address of said contractor, a name of said owner/obligee, an address of said owner/obligee, the bid date, an estimated contract price, an amount of bid security, a contract number or IFB number, and a job description.

38. A computer readable medium according to claim 30, wherein said computer system comprises a contractor computer, an agent computer, and a surety computer, said agent computer being coupled to communicate with one or more of said contractor computer and said surety computer; and wherein said requesting by said contractor of a bond from said surety comprises electronically transmitting said bond request from said contractor computer to said agent computer; and wherein said one or more screens to accommodate said process further comprises a screen to permit said agent to electronically transmit said bond request from said agent computer to said surety computer.

39. A computer readable medium according to claim 38, wherein said computer system further comprises an obligee computer, said obligee computer being coupled to communicate with one or more of said contractor computer and said agent computer; and wherein when said contractor submits said authorization code to said obligee, said one or more screens to accommodate said process permit verification, by said obligee, of said approval of said bond type by entering of said authorization code into said obligee computer to result in displaying of said approved bond on said obligee computer.

40. A computer readable medium according to claim 38, wherein when said requested bond amount exceeds a threshold amount, said bond request is approved only after said agent transmits said requested to said selected surety for approval.

41. A computer readable medium according to claim 40, wherein said contractor computer, said agent computer, said surety computer, and said obligee computer being coupled to communicate comprises communication by a network connection, said network connection comprising one or more of: a local area network connection, and an internet connection.

42. An integrated process of processing an application and issuing a surety bond, from a surety or an agent of one or more sureties to a contractor, for the benefit of an obligee, using a computer system, said integrated process comprising the following steps:

using one or more processors to execute instructions retained in a machine-readable storage media to cause said computer system to cause the display of one or more screens for use in executing said process;

storing, in a memory in said computer system, a list of one or more bond types;

pre-approving, by one or more surety companies, of an agent for access to said computer system, said pre-approved access comprising password protected access to said system, thereby providing authorization to said agent to issue bonds on behalf of each respective one or more surety companies;

storing, in said memory, a list of one or more sureties for which said agent has been authorized to issue bonds, said list comprising one or more sureties;

requesting, by said contractor from said agent, of a bond type from among said list of one or more bond types and a bond amount, to begin said application;

selecting, by said agent, of at least one surety from a screen displaying said list of one or more sureties;

selecting, by said agent, of said requested bond type from said screen, said screen displaying said list of one or more bond types;

inputting to said screen, contractor information and obligee information required by said selected surety for an application for issuance of said requested bond type;

reviewing, by said selected surety or by said agent of said selected surety, of said application;

dispositioning, by said selected surety or by said agent of said selected surety, of said application for said requested bond type, where said dispositioning comprises reaching a decision on said application, and wherein a decision approving of said request comprises issuing and providing of an authorization to said contractor.

43. An integrated process of processing an application and issuing a surety bond according to claim 42, further comprising submitting, by said contractor, of said authorization to said obligee.

44. An integrated process of processing an application and issuing a surety bond according to claim 43, further comprising verifying, by said obligee, of said approval of said application by viewing said authorization.

45. An integrated process of processing an application and issuing a surety bond according to claim 43 further comprising said agent granting an authorization to one or more employees of said agent, said authorization permitting said employees to access said computer system to enter said bond requests; and wherein said granting of authorization comprises a screen for said agent to input information of said employees.

46. An integrated process of processing an application and issuing a surety bond according to claim 45 further comprising one or more of: a screen permitting said surety to rescind said authorization of said agent at any time by invalidating said password; and a screen to permit said employee sub-authorizations to be terminated by said agent at any time.

47. An integrated process of processing an application and issuing a surety bond according to claim 46, wherein said issuing and providing of said authorization by said selected surety or by said agent of said selected surety comprises hand delivering said authorization to said contractor.

48. An integrated process of processing an application and issuing a surety bond according to claim 47, wherein said submitting by said contractor of said authorization to said obligee comprises said contractor hand delivering said authorization to said obligee at bid letting.

49. An integrated process of processing an application and issuing a surety bond according to claim 46, wherein said issuing and providing of said authorization by said selected surety or by said agent of said selected surety comprises displaying, for said contractor, of a bond authorization code on said computer system.

50. An integrated process of processing an application and issuing a surety bond according to claim 49, wherein said contractor places said authorization code on a bid and submits said bid to said obligee at a bid letting.

51. An integrated process of processing an application and issuing a surety bond according to claim 49, wherein said obligee enters said authorization code into said computer system to view said approved bond.

52. An integrated process of processing an application and issuing a surety bond according to claim 51, wherein said approval of said application further comprises recording on said issued bond of a date and time of said approval.

53. An integrated process of processing an application and issuing a surety bond according to claim 52, wherein said computer system comprises a contractor computer, an agent computer, and a surety computer, said agent computer being coupled to communicate with said contractor computer and said surety computer; and wherein said transmitting of said request for said bond type by said contractor to said agent comprises transmitting said request from said contractor computer to said agent computer.

54. An integrated process of processing an application and issuing a surety bond according to claim 53, wherein said computer system further comprises an obligee computer, said obligee computer being coupled to communicate with one or more of: said contractor computer and said agent computer; and wherein said contractor submission of said authorization code to said obligee comprises submitting said authorization code from either of said contractor computer and said agent computer, to said obligee computer.

55. An integrated process of processing an application and issuing a surety bond according to claim 54, wherein said instructions retained in said machine-readable media are stored in a memory on a server, and wherein said contractor computer, said agent computer, said surety computer, and said obligee computer are coupled to communicate through said server.

56. An integrated process of processing an application and issuing a surety bond according to claim 55, wherein said communication is by a network connection, said network connection comprising one or more of: a local area network connection, and an internet connection.

57. An integrated process of processing an application and issuing a surety bond according to claim 56, wherein said server comprises a web server, and wherein said web server stores said applicant inputted information, said selected bond type, and said authorization code.

58. An integrated process of processing an application and issuing a surety bond according to claim 57, wherein said obligee viewing said approval comprises accessing said web server from said obligee computer and inputting said authorization code to view said approved bond.

59. An integrated process of processing an application and issuing a surety bond according to claim 58, wherein said dispositioning by said agent response of said bond application is permitted on behalf of said surety by using one or more passwords controlled by said surety.

60. An integrated process of processing an application and issuing a surety bond according to claim 59, wherein said instructions further comprise providing a screen permitting each of said one or more sureties to assign exclusive use of a password to said agent; and wherein said agent uses said exclusively assigned password to approve or disapprove said bond application on behalf of said surety.

61. An integrated process of processing an application and issuing a surety bond according to claim 60, wherein said exclusively assigned password by said surety can be cancelled to rescind said agent's authorization to approve said request by said contractor for said bond.

62. An integrated process of processing an application and issuing a surety bond according to claim 61, wherein said required information to be inputted for said bond application comprises one or more of: a name and address of said contractor, a name and address of said obligee, a bid date, an estimated contract price, a bid security amount, a job description, and one or more of: a contract number and an IFB number.

63. An integrated process of processing an application and issuing a surety bond according to claim 62, wherein said one or more bond types is from the group of bond types consisting of: a bid bond, a contract bond, a court bond, a subdivision bond, a performance bond, a customs bonds, a notary bond, a liquor license bond, a license bond, a permit bond, a small business administration bond, a bail bond, a supersedeas bond, or a litigation bond.

64. An integrated process of processing an application and issuing a surety bond according to claim 63, wherein said selected surety is selected from a list box in said screen; wherein said requested bond type is selected from a second list box in said screen; and wherein said required contractor information and obligee information is inputted into an information box in said screen.

65. A method implemented by a computer system for obtaining a variety of types of bonds comprising:
- receiving, by the computer system, information on a contractor that is required by a surety to issue a bond from a workstation over a network connection;
- receiving, by the computer system, owner/obligee information required by said surety from said workstation over said network connection;
- generating, by the computer system, a list of one or more agents authorized to issue bonds on behalf of said surety;
- transmitting, by the computer system, said list of one or more agents to said workstation over said network;
- receiving, by the computer system, a selection of a surety agent sent from said workstation over said network;
- transmitting, by the computer system, one or more bond forms to a contractor workstation over said network connection;
- receiving, by the computer system, a selection of a bond form sent to said workstation over said network connection;
- transmitting, by the computer system, said required contractor information and said required owner/obligee information over said network connection to a computer system accessible by an agent acting on behalf of said surety; and
- receiving, by the computer system, approval of said bond form from said workstation over said network.

* * * * *